US006451433B1

(12) United States Patent
Oka et al.

(10) Patent No.: US 6,451,433 B1
(45) Date of Patent: Sep. 17, 2002

(54) FINE METAL PARTICLE-DISPERSION SOLUTION AND CONDUCTIVE FILM USING THE SAME

(75) Inventors: Tomoko Oka; Toshiharu Hayashi; Daisuke Shibuta, all of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/395,353

(22) Filed: Sep. 14, 1999

(30) Foreign Application Priority Data

Sep. 14, 1998 (JP) .......................................... 10-259965
Sep. 16, 1998 (JP) .......................................... 10-261960

(51) Int. Cl.[7] ................................................ B32B 9/00

(52) U.S. Cl. ....................... 428/432; 428/433; 428/446; 428/697; 252/514; 252/520.3; 106/1.23; 106/1.24; 106/1.28

(58) Field of Search ................................ 428/697, 432, 428/433, 446; 252/512, 514, 513, 518.1, 520.1, 520.3; 313/473; 106/1.23, 1.24, 1.28

(56) References Cited

U.S. PATENT DOCUMENTS 5,957,828 A * 9/1999 Hayashi
6,086,790 A * 7/2000 Hayashi et al.
6,180,030 B1 * 1/2001 Hirai et al.

FOREIGN PATENT DOCUMENTS

JP H10-88206 7/1999

* cited by examiner

*Primary Examiner*—Deborah Jones
*Assistant Examiner*—Jennifer McNeil
(74) *Attorney, Agent, or Firm*—Oblon, Spivak, McClelland, Maier & Neustadt, P.C.

(57) ABSTRACT

A fine metal particle-dispersion solution and a method for the solution are disclosed which enables to form a transparent conductive film having an uniform distribution of at least two kinds of metals and is produced by mixing an aqueous solution (A) of at lest one metal salt, the metal comprising one or more metals selected from the group consisting of Au, Pt, Ir, Pd, Ag, Rh, Ru, Os, Re and Cu and an aqueous solution (B) including citrate ion and ferrous ion under an atmosphere having substantially no oxygen to produce fine metal particles. A multi-layers conductive film having a low reflectivity, a low resistance and an excellent durability is available by using the dispersion solution of the present invention comprising Ag—Pd fine particles.

37 Claims, 12 Drawing Sheets

*FIG. 7a—1*
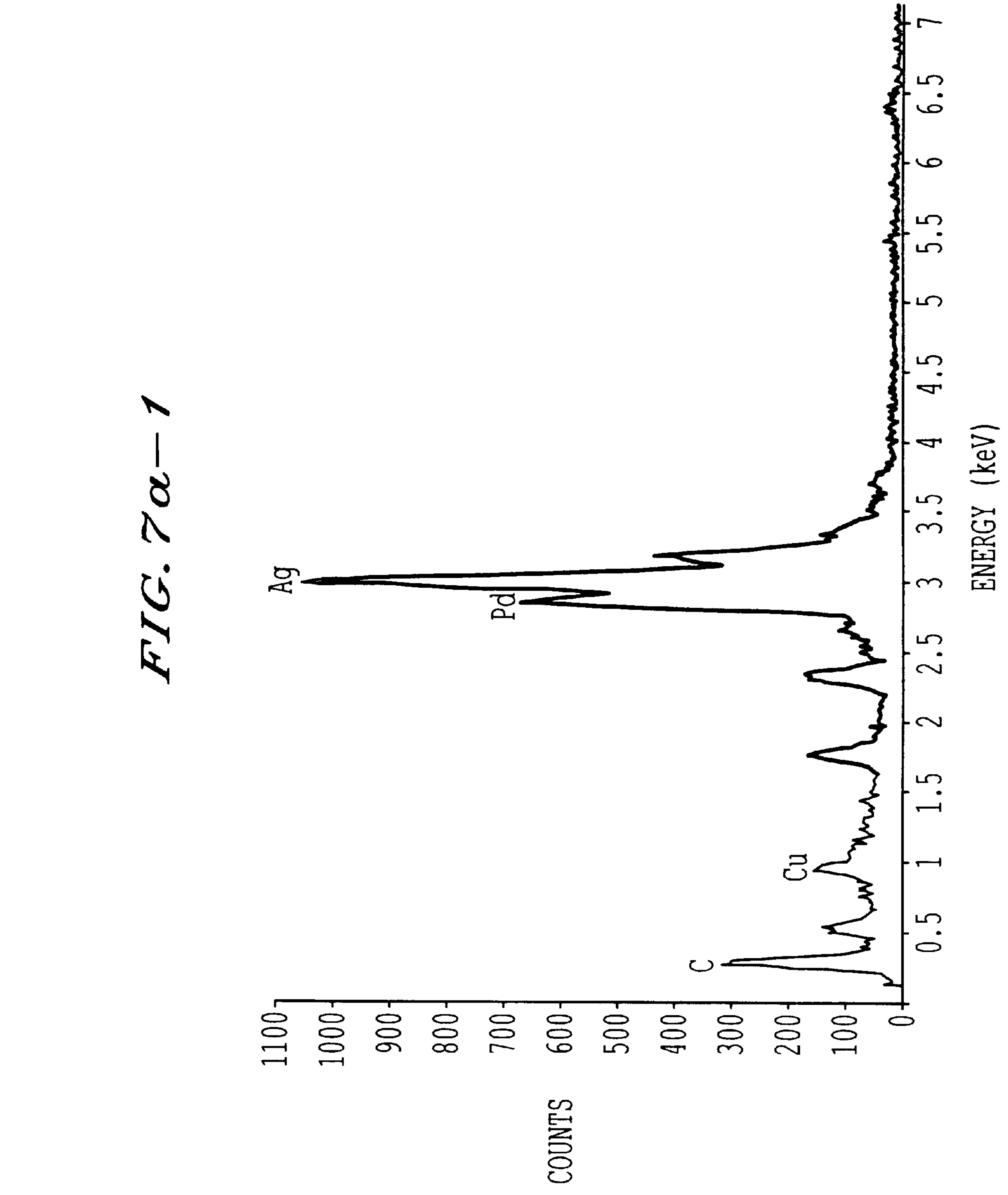

*FIG. 7a-2*

No.13

| | | | |
|---|---|---|---|
| COLUMN | :JEM2010F.PIONEER | | |
| TAKE-OFF ANGLE | :25 | ACCELERATING VOLTAGE | :200 |
| ACQUISITION TYPE | :eds | MAGNIFICATION | :100000 |
| CREATION TIME | :98/09/02 15:34 | CHARGE | :60 |
| LIVETIME | :60 | BEAM CURRENT | :1 |
| DEADTIME | :27.672 | BEAM SPOT SIZE | :0 |
| CHANNELS | :2048 | BEAM LOCATION | :0.0 |
| CHANNEL WIDTH | :10 | WORKING DISTANCE | :6.01536 |
| DETECTOR TYPE | :SILICON/LITHIUM | STAGE X | :0 |
| WINDOW TYPE | :NORVAR | STAGE Y | :0 |
| WINDOW THICKNESS | :0.3 | STAGE Z | :0 |
| COATING MATERIAL | :Al | STAGE TILT | :0 |
| COATING THICKNESS | :0.04 | STAGE ROTATION | :0 |
| CONTACT MATERIAL | :Au | CONTAMINATION MATERIAL | :NONE |
| CONTACT THICKNESS | :0.02 | CONTAMINATION THICKNESS | :0 |
| CRYSTAL THICKNESS | :3 | | |

FILE NAME:

NOTES:

WED SEP 2 15:33:05 1998

No.13

| ELEMENT | COUNTS | K-REL x.Si | K-Std x.Si | Wt % | ATOM % |
|---|---|---|---|---|---|
| Pd-L | 11219 | 1.752 | --- | 41.17 | 41.50 |
| Ag-L | 16447 | 1.708 | --- | 58.83 | 58.50 |
| TOTAL | | | | 100.00 | 100.00 |

*FIG. 7b—1*
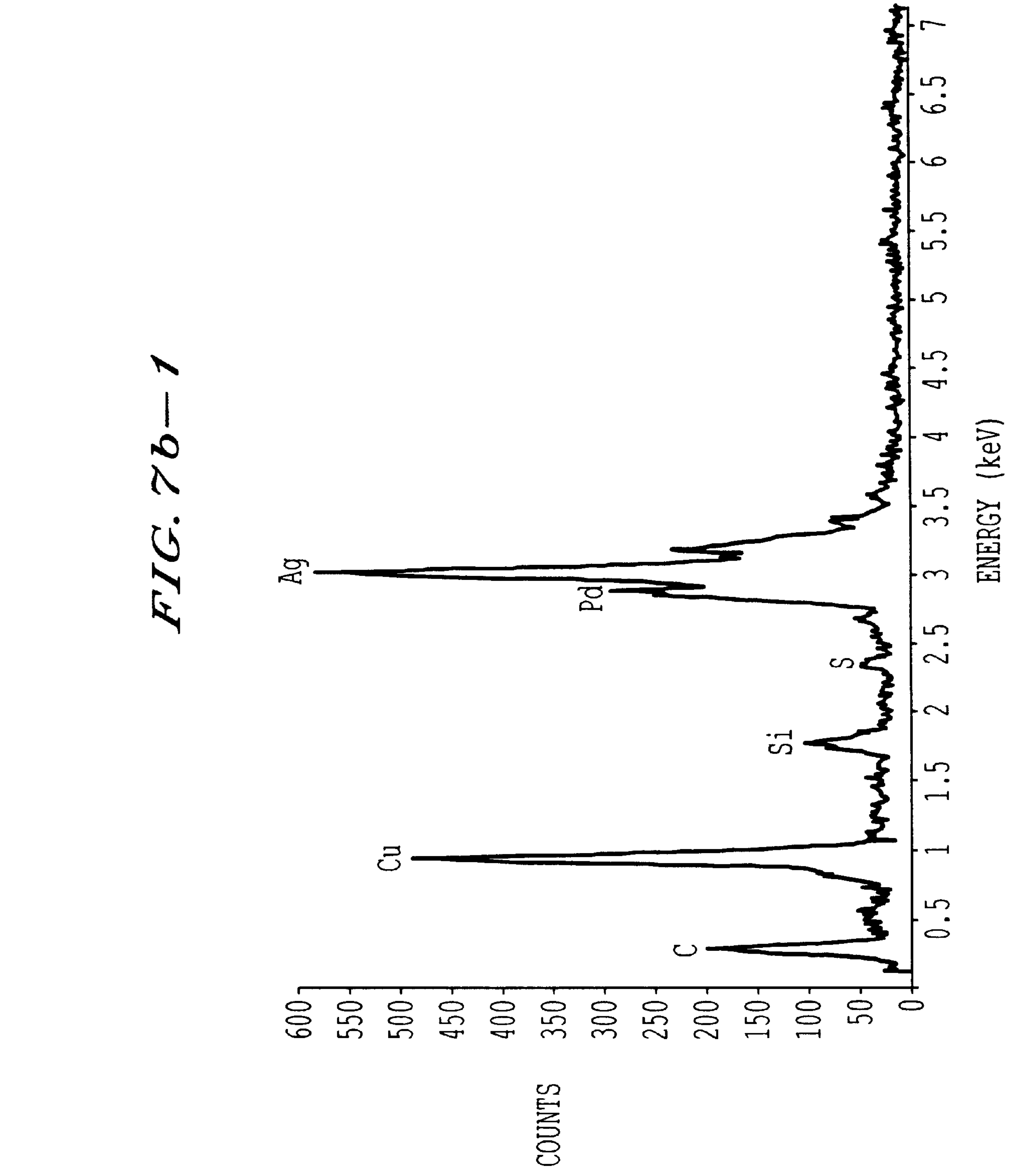

FIG. 7b-2

No.4

| | | | |
|---|---|---|---|
| COLUMN | :JEM2010F.PIONEER | | |
| TAKE-OFF ANGLE | :25 | ACCELERATING VOLTAGE | :200 |
| ACQUISITION TYPE | :eds | MAGNIFICATION | :100000 |
| CREATION TIME | :98/09/02 15:08 | CHARGE | :100 |
| LIVETIME | :100 | BEAM CURRENT | :1 |
| DEADTIME | :30.583 | BEAM SPOT SIZE | :0 |
| CHANNELS | :2048 | BEAM LOCATION | :0.0 |
| CHANNEL WIDTH | :10 | WORKING DISTANCE | :6.01536 |
| DETECTOR TYPE | :SILICON/LITHIUM | STAGE X | :0 |
| WINDOW TYPE | :NORVAR | STAGE Y | :0 |
| WINDOW THICKNESS | :0.3 | STAGE Z | :0 |
| COATING MATERIAL | :Al | STAGE TILT | :0 |
| COATING THICKNESS | :0.04 | STAGE ROTATION | :0 |
| CONTACT MATERIAL | :Au | CONTAMINATION MATERIAL | :NONE |
| CONTACT THICKNESS | :0.02 | CONTAMINATION THICKNESS | :0 |
| CRYSTAL THICKNESS | :3 | | |

FILE NAME:

NOTES:

WED SEP 2 15:07:12 1998

No.4

LIVETIME: 19.6 Sec.

TECHNIQUE: LEAST SQUARES FIT

| ELEMENT | COUNTS | K-REL x.Si | K-Std x.Si | Wt % | ATOM % |
|---|---|---|---|---|---|
| Pd-L | 4767 | 1.752 | --- | 37.18 | 37.50 |
| Ag-L | 8264 | 1.708 | --- | 62.82 | 62.50 |
| TOTAL | | | | 100.00 | 100.00 |

FIG. 7c—1
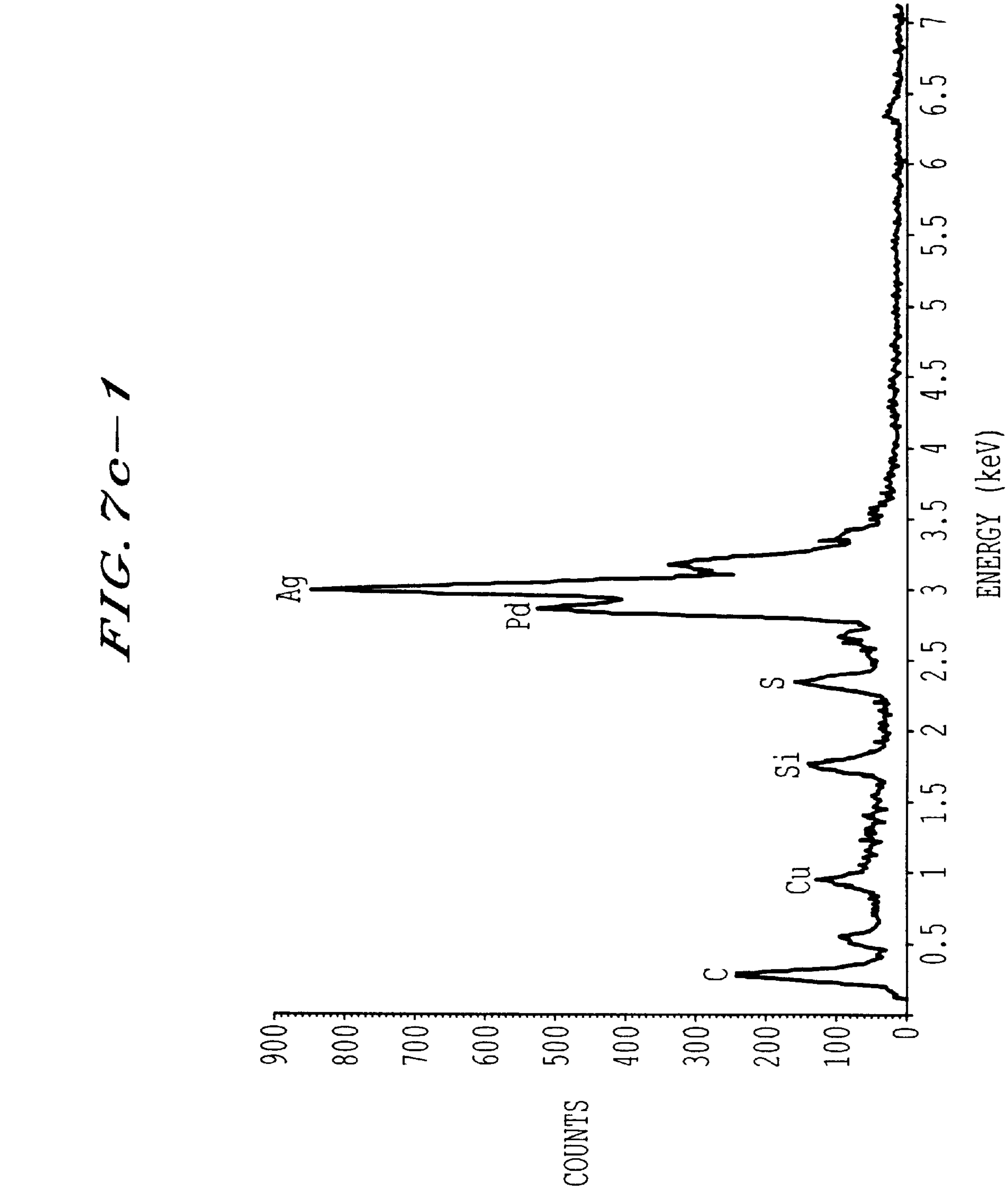

*FIG. 7c-2*

No.11

| | | | |
|---|---|---|---|
| COLUMN | :JEM2010F.PIONEER | | |
| TAKE-OFF ANGLE | :25 | ACCELERATING VOLTAGE | :200 |
| ACQUISITION TYPE | :eds | MAGNIFICATION | :100000 |
| CREATION TIME | :98/09/02 15:23 | CHARGE | :41 |
| LIVETIME | :41 | BEAM CURRENT | :1 |
| DEADTIME | :20.672 | BEAM SPOT SIZE | :0 |
| CHANNELS | :2048 | BEAM LOCATION | :0.0 |
| CHANNEL WIDTH | :10 | WORKING DISTANCE | :6.01536 |
| DETECTOR TYPE | :SILICON/LITHIUM | STAGE X | :0 |
| WINDOW TYPE | :NORVAR | STAGE Y | :0 |
| WINDOW THICKNESS | :0.3 | STAGE Z | :0 |
| COATING MATERIAL | :Al | STAGE TILT | :0 |
| COATING THICKNESS | :0.04 | STAGE ROTATION | :0 |
| CONTACT MATERIAL | :Au | CONTAMINATION MATERIAL | :NONE |
| CONTACT THICKNESS | :0.02 | CONTAMINATION THICKNESS | :0 |
| CRYSTAL THICKNESS | :3 | | |

FILE NAME:

NOTES:

WED SEP 2 15:23:55 1998

No.11

| ELEMENT | COUNTS | K-REL x.Si | K-Std x.Si | Wt % | ATOM % |
|---|---|---|---|---|---|
| Pd-L | 8454 | 1.752 | --- | 41.11 | 41.44 |
| Ag-L | 12424 | 1.708 | --- | 58.89 | 58.56 |
| TOTAL | | | | 100.00 | 100.00 |

FINE METAL PARTICLE-DISPERSION SOLUTION AND CONDUCTIVE FILM USING THE SAME

BACKGROUND OF THE INVENTION

1. Field of the Invention

The present invention relates to a fine metal particle-dispersion solution including metals such as noble metal and copper (a metal colloid) and a method for producing the solution; a coating solution for forming electrically conductive films; a conductive film using the solution and a method for forming the film. The fine metal particle-dispersion solution of the present invention is useful for various purposes and particularly useful for transparent films, more particularly for a transparent film for providing a Braun tube and/or a CRT of a TV and/or a computer with an antistatic property for static electricity, a sealing property for electromagnetic waves including ultraviolet rays and infrared rays and an anti-glaring property, which requires a low temperature baking.

2. Description of the Related Art

Since fine metal particles having a mean primary particle size of from several nm to several tens of nms (a metal colloid) can pass rays therethrough, a transparent film can be formed by combining the particles with a binder. Particularly silver fine particles are widely used for the above-mentioned use.

In relation to a transparent film for a Braun tube and a CRT of a TV and/or a computer, it is known that the Braun tube of a TV and a CRT of a computer can be provide with an antistatic property for static electricity and anti-glaring property (protection from the projection of an outer light) by a two layer film formed by an upperlayer of a transparent film having a low refractive index (for example, a film composed of a silica type material) on an underlayer of a transparent film having a high refractive index. The transparent film having the above-mentioned two layers composed of semiconductor fine particles such as ITO (indium oxide doped by tin) and ATO (tin oxide doped by antimony) is disclosed in JP-A 5-290634 and JP-A 6-12920.

Recently, there have developed concerns over bad influences on the human body produced by electromagnetic waves released from Braun tubes and CRTs and error functioning of computers caused by electromagnetic waves from outside thereof, and there have been set in various countries new standards for the emission of electromagnetic waves of low frequency. Consequently an electromagnetic wave-sealing property has been required for Braun tubes and CRTS. For providing the electromagnetic wave-sealing property, it is necessary to form a conductive film having a low resistance of from $10^2$ to $10^3\Omega/\square$ in terms of surface resistance on the surface of the Braun tube or CRT which is a base. As the underlayers of the transparent film according to the above-mentioned two layers have a low conductivity, it is difficult to obtain the low resistance as mentioned-above.

Accordingly, trials were carried out to satisfy all of the electromagnetic wave-sealing property, antistatic property and anti-glare property by forming the underlayer of transparent film of the two layers using metal particles having a mean primary particle size of up to 0.2 $\mu$m (200 nm), in some case, up to 0.05 $\mu$m (50 nm) to provide a low resistance. For examples, JP-A 8-77832, JP-A 9-115438, JP-A 9-331183, JP-A 10-74772, JP-A 10-154473 disclose the above-mentioned trials. The fine particles of noble metal are mainly used and the fine particles of Ag are most frequently used as fine metal particles from the standpoint of conductivity.

A particle size having a mean primary particle size of up to 200 nm are within a colloid area. That is, a dispersion solution including metal particles having the mean primary particle size of such a small size is a metal colloid. The metal colloid is hydrophobic. As the fine metal particles as a dispersion have an inferior affinity for water as a dispersion medium, the metal colloid is thermodynamically unstable with the result that aggregation easily arises when an electrolyte exists. Accordingly, it is necessary to add a large amount of a protective colloid (a hydrophilic colloid such as a water-soluble polymer) having a function to stabilize the hydrophobic colloid such that the metal colloid can be stable.

In case of a metal colloid containing a large amount of the protective colloid, the protective colloid which is typically an organic material having no conductivity impedes conductivity when used for forming a conductive film. For that reason, a sufficient conductivity is unavailable without raising the baking temperature for forming the transparent film up to a high temperature which makes it possible completely to dissolve and purge the organic material (for example, higher than 350° C.). However such a high baking temperature causes the drop of a phosphor included in the Braun tube, the inferiority of measurement accuracy, the change of vacuum balance due to a gas generation and the corrosion of a electron gun in case of forming a transparent film on a Braun tube or a CRT of a TV and/or computer.

It is known from more than 100 years ago that an aqueous solution of metal salt is reacted with a reduction agent to produce a metal colloid. However, any methods use a large amount of a protective colloid to stabilize the metal colloid except for the method disclosed by Carey Lea in 1889 (M. Carey Lea, American Journal of Science, 37:491, 1989).

According to the Carey method, an aqueous solution of sodium citrate and an aqueous solution of ferrous sulfate are mixed, thereby adjusting the aqueous solution of reduction agent including citrate ion and ferrous ion (that is, aqueous solution of ferrous sulfate), and then the adjusted aqueous solution of reduction agent is mixed with an aqueous solution of silver nitrate to reduce silver nitrate with the result of obtaining a silver colloid. Citrate ions stabilize the colloid adsorbed to fine silver particles such that the silver colloid can be stabilized without adding a polymer protective colloid.

In principle, this method can be used for producing any other noble metal colloid by replacing the aqueous solution of silver nitrate with an aqueous solution of another noble metal salt.

JP-A 10-66861 discloses a silver colloid solution and the method for producing the same, based on the Carey Lea method. According to the method, the aqueous solution of the reduction agent and the aqueous solution of silver nitrate are mixed while stirring at from 1,000 to 10,000 rpm, preferably changing the temperature or stirring speed during the process, thereby to precipitate fine silver particles having various sizes. The precipitated fine silver particles are recovered by centrifugation and the recovered fine particles are dispersed in water such that a solid content of silver is from 1 to 80 wt. % for use as a coating material for forming a transparent conductive film.

According to the Carey Lea method and the method disclosed in JP-A 10-66861, the stabilized colloid can be obtained in case of a silver colloid and some noble metal colloid.

However, the stabilized colloid can not be necessarily obtained by the above-mentioned methods in case of another noble metal and other metals such as Cu. Furthermore, serious problems have been found when a metal colloid is produced using two or more kinds of metals (for example, silver and palladium). That is, according to the above-mentioned methods, different kinds of metals precipitate individually (for example, silver and palladium individually) to form the metal colloid. Accordingly, when the metal colloid is used for a coating material, fine metals particles move during forming a film or baking the film and the fine particles of the same kind of metal is easy to gather each other with the result that there is a tendency to form a film having a nonuniform distribution of different kinds of metals therein. Therefor, a film property differentiates according to part by part of the film with the result that a transparent conductive film having a stable quality can not be obtained.

In addition, when the above-mentioned two layer film is formed using the silver colloid produced by the Carey Lea method and the method disclosed in JP-A 10-66861, the following results have been found: Fine metal particles of the transparent conductive film of the underlayer are subject to changes of particle forms due to surrounding factors such as temperature and humidity. This causes an unstable conductivity of the film and in some cases the film peels off. If the fine metal particles are laid compactly to stabilize the conductivity, the transparency falls steeply, the adhesion property of the film falls remarkably and the film can not be practically used.

As mentioned above, durability such as thermal resistance, humidity resistance, chemical resistance and weather resistance (ultraviolet rays resistance) in the transparent conductive film using the conventional silver colloid is not necessarily sufficient, for example, the film on a Braun tube suffers a secular change and the electric resistance of the film increases gradually with the result that there is a possibility to lose properties required for the transparent conductive film, particularly an electromagnetic wave-sealing function and in some cases the film peels off.

We, inventors have found that the durability of the transparent conductive film formed from the silver colloid can be remarkably improved by mixing palladium, that is, using a metal colloid including fine silver and palladium particles.

However, when the film is formed using the metal colloid including fine silver and palladium particles produced by the above-mentioned conventional methods, a transparent conductive film is formed in which the fine silver particles and the fine palladium particles distribute nonuniformly and a transparent conductive film having a uniform distribution of silver and palladium can not be obtained.

SUMMARY OF THE INVENTION

An object of the present invention is to provide a metal colloid (that is, a fine metal particle-distribution solution) from which a transparent conductive film having a uniform metals distribution therein can be obtained when the transparent conductive film including two or more kinds of metals is formed from the metal colloid, and a method for producing the metal colloid.

A further object of the present invention is to provide a coating solution for forming a conductive film which enables the formation of a transparent conductive film having a thermal resistance, humidity resistance, chemical resistance and weather resistance greater than a transparent conductive film formed from the silver colloid such that the above-mentioned problems due to using the silver colloid can be solved, and to provide a low resistance conductive film formed from the coating solution, particularly above-mentioned two layer film having a low reflectivity.

The present inventors have studied a metal colloid including fine particles comprising two kinds of metals and a method for producing the colloid, based on the Carey Lea method for producing a silver colloid and have found that a reaction condition in mixing an aqueous solution of reduction agent and an aqueous solution of metal salt to be reduced has a great influence on the result of the reaction and when the mixing is carried out under an atmosphere having substantially no oxygen such as an inert gas atmosphere, a metal colloid can be obtained which includes fine metal particles produced by precipitation of two metals in the mixed state each other (that is, an alloyed state).

Two metals are alloyed in the fine metal particles of the metal colloid obtained by this method and all the fine particles comprise the same metal composition. Accordingly, when film forming is carried out using this colloid, a transparent forming conductive film can be obtained which reliably has a uniform distribution of the two metals in any part of the film. The evidence that two metals in the fine metal particles of the metal colloid are alloyed is verified by the result that the metal composition ratio of a filtrate is substantially the same as that of a precipitate at any gravitational acceleration when the metal colloid is centrifuged at different gravitational acceleration values (the difference is within the range of 6%).

The above-mentioned method can be applied to a metal colloid comprising two or more (e.g. three, four and five) kinds of metals. In addition, the following findings have been found: A metal colloid can be stably produced by this method in any case of one kind of metal selected from all the noble metal (that is, Au, Pt, Ir, Pd, Ag, Rh, Ru, Os), Re and Cu, and the precipitated metal particles are fine and the particle size scattering of the particles is very small.

Furthermore, the present inventors have found the following findings.: A durability of the film formed from a silver colloid can remarkably be improved by mixing palladium, that is, by using a metal colloid including Ag—Pd fine particles. However, when a metal colloid is produced according to the Carey Lea method, Ag and Pd precipitate individually to form a metal colloid and when the metal colloid is used as a coating solution, the fine metal particles move during forming a film or baking the film and the same kind of metal is easy to gather each other with the result that the film having a ununiform distribution of Ag and Pd is produced. In this case, as a good durability can not be obtained and in addition, the properties of the film vary at every part of the film, a transparent film can not be obtained which has a stable quality.

Thereupon, the present inventors have studied a metal colloid including fine metal particles comprising Ag and Pd and a method for producing the colloid, based on the Carey Lea method for producing a silver colloid and have found that a reaction condition in mixing an aqueous solution of reduction agent and an aqueous solution of metal salt to be reduced has a great influence on the result of reaction and when the mixing is carried out under an atmosphere having substantially no oxygen such as an inert gas atmosphere, a metal colloid can be obtained which includes alloyed fine metal particles produced by precipitation of Ag and Pd in the mixed state each other.

Ag and Pd are alloyed in the Ag—Pd fine particles of the metal colloid obtained by this method and all the fine particles comprise substantially the same metal composition ratio. Accordingly, when film-forming is carried out using this colloid, a transparent conductive film can be obtained which reliably has a uniform distribution of Ag and Pd in any part of the film. The evidence that Ag and Pd are alloyed is verified by the result that the metal composition ratio of a filtrate is substantially the same as that of a precipitate at any gravitational acceleration when the metal colloid is centrifuged at different gravitational acceleration values (the difference is within the range of 6%).

The first aspect of the present invention includes a method for producing a fine metal particle-dispersion solution and the fine metal particle-dispersion solution produced by this method. The method comprises the following steps ① adjusting an aqueous solution of metal salt (A) the metal comprising one or more metals selected from the group consisting of Au, Pt, Ir, Pd, Ag, Rh, Ru, Os, Re and Cu;

② adjusting an aqueous solution (B) including citrate ion and ferrous ion; and

③ mixing solution (A) and solution (B) under an atmosphere comprising substantially no oxygen to produce fine metal particles.

This method optionally includes the steps of recovering fine metal particles from the mixed solution after step ③ followed by desalting the fine metal particles and redispersing the desalted fine metal particles in water and/or an organic solvent. In addition, in a preferred embodiment step ② of adjusting the aqueous solution (B) is carried out under an atmosphere having substantially no oxygen and step ③ of mixing aqueous solution (A) and aqueous solution (B) is carried out while stirring at from 25 to 95° C.

The fine metal particle-dispersion solution of the present invention is a solution in which fine metal particles are dispersed in water and/or an organic solvent, the metal comprising one or more metals selected from the group consisting of Au, Pt, Ir, Pd, Ag, Rh, Ru, Os, Re and Cu, and when the dispersion solution is centrifuged at two or more different gravitational acceleration values, the metal composition ratio of a filtrate is substantially the same as that of a precipitate at any gravitational acceleration (the difference is within a range of 6%).

A second aspect of the present invention includes a coating solution for forming a conductive film which comprises Ag—Pd fine particles included in water and/an organic solvent, the Ag—Pd fine particles being precipitated by mixing an aqueous solution (A) of a silver salt and a palladium salt and an aqueous solution (B) of citrate ion and ferrous ion under an atmosphere having substantially no oxygen.

The preferable second aspect of the present invention includes the following

① the Ag—Pd fine particles are desalted after precipitation;

② solution (B) is adjusted under an atmosphere having substantially no oxygen;

③ solution (B) comprises citrate ion and ferrous ion of from one to five moles each relative to a total valence number of metal ion in solution (A), and has a pH 3 to 10;

④ solution (A) and solution (B) are mixed under stirring at from 25 to 95° C. such that pH of the mixed solution is from 3 to 9 after mixing and a stoichiometric amount of metal formation is from 2 to 60 g/L.

and/or

⑤ a Pd/(Pd+Ag) weight ratio in solution (A) is from 0.001 to less than 1 and a primary mean particle size of the fine particles is from 1 to 15 nm.

The coating solution for forming a conductive film of the present invention is a solution in which Ag—Pd fine particles are dispersed in water and/or an organic solvent and when the dispersion solution is centrifuged at two or more different gravitational acceleration values, the metal composition ratio of a filtrate is substantially the same as that of a precipitate at any gravitational acceleration (the difference is within the range of 6%).

The coating solution for forming a conductive film of the present invention optionally contains an inorganic binder and/or an organic binder and is preferably provided with pH of from 3.2 to 8.0, an electric conductivity of up to 2.0 mS/cm and a metal content of from 0.1 to 10 wt. %.

According to the present invention, the second aspect further includes a multi-layer conductive film having a low resistance which is provided by forming a Ag—Pd fine particle film by coating on a base the coating solution for forming a conductive film of the present invention having no binder, followed by drying the coated solution and then by forming a transparent upperlayer by coating on the Ag—Pd film a binder-contained solution, preferably a solution having a silica precursor, followed by drying thereof.

According to the present invention, the second aspect still further includes a multi-layer conductive film having a low reflectivity, a low resistance and an excellent durability which is formed on a base and comprises two layers of an underlayer and upperlayer, wherein the underlayer includes Ag—Pd fine particles formed by the above-mentioned coating solution for forming a conductive film of the present invention and the upperlayer comprises a transparent film having a refractive index lower than that of the underlayer, the upperlayer film preferably comprising a silica type material. The base is preferably an image display part of an image display device.

BRIEF DESCRIPTION OF THE DRAWINGS

FIG. 1(*a*) is a SEM photograph demonstrating an initial microstructure of a two layer film comprising an underlayer film formed by using a coating solution for forming a conductive film which includes Ag—Pd fine particles of the present invention and an upperlayer film of a silica-type material;

FIG. 1(*b*) is a SEM photograph demonstrating a microstructure of the two layer film after heating at 250° C. for one hour.

FIG. 4(*a*) and FIG. 4(*b*) are 50,000 and 500,000 magnifications respectively.

FIG. 5(*a*) and FIG. 5(*b*) are 50,000 and 100,000 magnifications respectively.

FIG. 6(*a*), FIG. 6(*b*) and FIG. 6(*c*) are photographs, each showing an irradiated point in each one particle of sample No.10 in Example 1 to make an elementary identification with field emission electron microscope.

FIG. 7: FIG. 7(*a*), FIG. 7(*b*) and FIG. 7(*c*) are photographs, each showing the result of the elementary identification with the field emission electron microscope at a point corresponding to FIG. 6(*a*), FIG. 6(*b*) and FIG. 6(*c*).

DESCRIPTION OF PREFERRED EMBODIMENTS

Figure 1A:
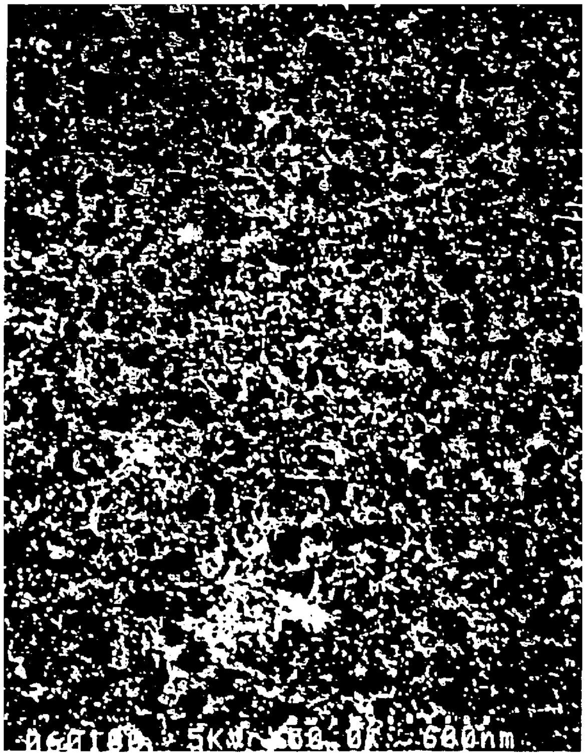
FIG. 1.

Preferred embodiments of the invention are described in detail hereinunder.

The first aspect of the present invention is mentioned below.

The present invention is based on the above-mentioned Carey Lea method for producing a metal colloid.

First, are arranged an aqueous solution (A) (referred to as "solution (A)" hereinafter) including one or more metal salts for precipitating the metal or the metals as a metal colloid which are selected from the group consisting of Au, Pt, Ir, Pd, Ag, Rh, Ru, Os, Re and Cu. The preferable salts are water-soluble ones which are easily reduced to a metal by a reduction agent. Generally, nitrates, nitrites, sulfates, chlorides, acetates and the like are preferable, though the preferable salts are different according to a kind of metal.

The preferable metal salts are enumerated below, though not limited to these listed salts.

Au:aurous chloride, auric chloride, chlorogold acid,

Pt:platinous chloride, ammonium platinous chloride,

Ir:iridium trichloride, iridium tetrachloride, ammonium iridium hexachloride, potassium iridium hexachloride, iridium acetate, Pd:palladium chloride, ammonium palladium tetrachloride, potassium palladium hexachloride, palladium acetate, palladium nitrate, Ag:silver nitrate, silver nitrite, silver chloride, Rh:rhodium trichloride, ammonium rhodium hexachloride, potassium rhodium hexachloride, rhodium hexamine chloride, rhodium acetate, Ru:ruthenium nitrosonitrate, ruthenium chloride, ammonium ruthenium chloride, potassium ruthenium chloride, sodium ruthenium chloride, ruthenium acetate, Os:osmium trichloride, ammonium osmium hexachloride, Re:rhenium trichloride, rhenium pentachloride, Cu:copper sulfate, copper nitrate The preferable metal salts are a combination of a Pd salt and a Ag salt and in this case the solution (A) preferably includes the Ag salt and Pd salt such that a Pd/(Pd+Ag) weight ratio in the solution (A) is from 0.001 to less than 1. The Pd/(Pd+Ag) weight ratio is more preferably from 0.15 to 0.6.

Separately, is prepared an aqueous solution (B) having a reduction agent (referred to solution (B) hereinafter). The solution (B) is an aqueous solution including citrate ions and ferrous ions (that is, ferrous citrate). While ferrous citrate is obtained as a crystal of monohydrate, the crystal is not suitable for adjusting the aqueous solution thereof due to a low water-solubility. For that reason, it is preferable that the citrate ions and the ferrous ions are supplied by different compounds each other as in the Carey Lea method. That is, the citrate ions are supplied by citric acid and/or citrates and the ferrous ions are supplied by ferrous salt.

Non-limiting examples of citrates suitable for adjusting the solution include sodium citrate, potassium citrate and ammonium citrate, and ferrous salts include iron sulfates, iron nitrates, ammonium iron sulfates, iron oxalates and iron acetates. Citrates and ferrous salts other than the above-mentioned ones can be used if water-solubility and acidity or (basicity) are proper.

The solution (B) including citrate ions and ferrous ions are prepared by adjusting an aqueous solution having citric acid and at least one citric compound selected from the citrates, followed by adding to the aqueous solution at least one ferrous salt as a solid. Alternatively, the solution (B) may be prepared by adjusting an aqueous solution having at least one ferrous salt, followed by mixing the aqueous solution of the ferrous salt and the aqueous solution of the citric compound.

As the solution (B) acts as a reduction agent, the solution is easily oxidized. Therefore, the solution (B) is preferably prepared under an atmosphere having substantially no oxygen, followed by keeping the prepared solution under the same atmosphere so as to protect the solution (B) from being oxidized before the solution (B) is mixed with the solution (A).

The amounts, concentrations and pHs of the solution (A) and the solution (B) preferably satisfy the following conditions. Each content of citrate ion and ferrous ion in the solution (B) is from one to five moles relative to a total valence number of metal ion in the solution (A) and the pH of the solution (B) is from pH 3 to 10. The final pH after mixing and reacting the solution (A) and the solution (B) is from 3 to 9 and a stoichiometric amount of metal formation is from 2 to 60 g/L.

Mixing the solution (A) and solution (B) accompanies reducing metal salt(s) of the solution (A) to the metal(s) by action of the reduction agent in the solution (B) (ferrous ion) to precipitate fine particles of the metal(s) with the result that a fine metal particle-dispersion solution, that is, a metal colloid is produced. The mixing of the present invention is carried out under an atmosphere having substantially no oxygen. Preferably, the mixing is carried out by adding the solution (A) to the solution (B) with stirring at 25 to 95° C.

Conventionally, this mixing is carried out in an air atmosphere. In the conventional mixing method, specifically in case of two kinds of metals to be precipitated, each metal precipitates individually. As a result, the metal composition ratio of the filtrate is different from that of the precipitate when the resulted fine metal particle-dispersion solution is centrifuged at two or more different gravitational acceleration values (for examples, 500, 1,000, 1,500×G) and both the analysis values of the filtrate and precipitation change according to gravitational acceleration values at that. Accordingly, for example in case of separating the precipitated fine metal particles by centrifugation, it is difficult to estimate the metal composition ratio of the separated fine metal particles and the metal composition ratio of the separated fine metal particles varies even if a fluctuation of the centrifugation condition is small. As a result, it is difficult to produce fine metal particles having a stable quality.

Furthermore, when the dispersion solution having fine metals particles which are precipitated separately for each kind of metal is used as a coating material, the fine metal particles move during forming a film or baking the film and the fine particles of the same kind of metal is easy to gather each other with the result that there is a tendency to form a film having a nonuniform distribution of different kinds of metals therein. Therefor, a film property differentiates according to part by part of the film with the result that a transparent conductive film having a stable quality can not be obtained. And that, the fine metal particles precipitated in air are easy to form oxides and have a nonuniform distribution of particle size. As a result, the solution is unstable during preservation to form a nonuniform film.

When the solution (A) and solution (B) are mixed under an atmosphere having substantially no oxygen according to the present invention, preferably with stirring at 25 to 95° C., in case of the solution (A) comprising two kinds of metals, an analysis value on the metal composition ratio of a filtrate is substantially the same as that of a precipitate at any gravitational acceleration (the difference is within the range of 6%) when the fine metal particle-dispersion solution produced by the mixing is centrifuged at two or more different gravitational acceleration values. In addition, both the analysis values on the filtrate and precipitate are almost unchangeable, substantially settled (the change is within a range of 6%) and are substantially the same as that of an analysis value on the metal composition ratio of the fine metal particle-dispersion solution itself. This result means that two or more kinds of metals precipitate together in each single particle and are alloyed in the particle.

Accordingly, fine metal particles having an almost constant metal composition ratio can be obtained as the metal composition ratio of the separated fine metal particles are substantially the same as that of the dispersion solution even when the fine metal particles are separated by centrifugation and the metal composition ratio is almost unchangeable even if the centrifugation condition is widely changed. When the obtained fine metal particle-dispersion solution is used for a coating material, a transparent conductive film can be obtained which has constantly a uniform distribution of each metal with an unchangeable metal composition ratio and a stable quality as the metal composition ratio of all the particles is the same even if the fine metal particles move during forming the film or baking the film.

Furthermore, as the composition of the fine metal particles are the same, the scattering of the fine metal particles size is very small. For example, in case of fine particles having a mean particle size of 5 nm, most of the particles (at least 90%) are within a small range of particle size of from 3 to 7 nm. Therefore, the above-mentioned movement of the particles size is very small The above-mentioned description, "an atmosphere having substantially no oxygen" at the step of mixing a solution (A) and a solution (B) is defined by an atmosphere having up to an oxygen partial pressure of 0.05 atm. This atmosphere is obtainable by a vacuum or an inert gas atmosphere when the mixing is carried out in a closed system. However, as the mixing is usually carried out in an open system, the above-mentioned atmosphere can be obtained by flowing an inert gas (for examples, nitrogen, argon, helium). From the standpoint of economy, the mixing under a nitrogen gas flow is preferable. While reduction gases such as hydrogen gas and a mixed gas of hydrogen and inert gas are usable, it is more easy to handle the inert gas as the hydrogen gas and the mixed gas are combustible.

Removal of oxygen from the solutions A and B may be by conventional methods known to those of ordinary skill in the art, such as by degassing under reduced pressure or with an inert gas. Oxygen removal may be conducted before or after addition of the respective solute.

In case of the mixing temperature of lower than 25° C., there is a possibility that the above-mentioned alloying is not sufficient and is the same as that in case of the mixing in air though an upper limit of the mixing temperature is not specifically limited, the temperature of higher than 95° C. is impossible as the process comprises a water system and the water vaporizing is great without pressurization. The more preferable mixing temperature is from 30 to 80° C., the most preferable is from 35 to 60° C.

Preferably the mixing is carried out under stirring. Though the speed of stirring is not specifically limited, the range is usually from 30 to 1,000 rpm. As the mixing speed and mixing temperature have an effect on a particle size of the precipitated particles and the temperature has an effect on the metal composition ratio of the precipitated fine metals particles comprising two or more kinds of metals, the speed and temperature are decided such that a desired particle size and metal composition ratio is attained.

The mixing time is decided so as to finish the reduction of metal salts almost completely 5 to 120 minutes are usually selected. The fine metal particle-dispersion solution thus obtained can be used for appropriate uses (for example, for preparing a coating material) as it is or after the concentration control of fine metal particles (dilution or concentration). However, as there are a large amount of unreacted materials and electrolytes as reaction products in the solution, these materials often bring about the deterioration of a product quality (for example, a transparent conductive film).

Accordingly, it is preferable that fine metal particles are recovered from the dispersion solution produced by mixing, the adhered electrolytes are removed from the recovered particles by an appropriate desalting treatment and the fine particles are re-dispersed in water or an organic solvent (repulp). The recovery of the fine metal particles are carried out by appropriate methods such as sedimentation, filtration and centrifugation depending on an aggregation state of the fine particles. The desalting treatment after that is carried out by, for examples, ion exchange or dialysis. The recovery can be also carried out by adding an aqueous solution of sodium nitrate to the dispersion solution to aggregate the fine particles and washing out the electrolytes, followed by centrifugation treatment. The citrate ions adsorbed to the fine metal particles are not removed by these desalting treatment and the citrate ions perform a role of a protective colloid-like to stabilize the dispersion of the fine metal particles.

The fine metal particles after desalting treatment are re-dispersed in water (deionized water) and/or a water-soluble organic solvent (for examples, alcohol, ketone, alkoxyalcohol) by adding the water and/or the solvent to obtain again a fine metal particle-dispersion solution such that a desired metal content is obtained in the solution. The fine metal particle-dispersion solution of the present invention can be also a nonaqueous dispersion solution by adding a proper dispersion agent (for example a surfactant). For example, the nonaqueous dispersion solution can be produced by recovering the fine metal particles from the dispersion solution after desalting treatment, followed by dispersing again the recovered particles in an organic solvent having a proper additive. That is, water, the mixed solvent of water and an organic solvent, and an organic solvent are all useful as a dispersion solvent for the fine metal particles dispersion of the present invention. A coating additive and improvement additive such as pH adjustment agent may be added if necessary.

According to the fine metal particle-dispersion solution after the desalting treatment, a pH of from 3.2 to 8.0, an electric conductivity of up to 2.0 mS/cm, an amount of metal content of 0.1 to 10 wt. % are preferable. Outside the above-mentioned preferable ranges, there is a possibility that the dispersion state is unstable and a film property is deteriorated when the dispersion solution is used for a coating solution. Citrate ions are adsorbed to the surface of the fine metal particles with the result of stabilizing the dispersion state like the protective colloid.

The fine metal particle-dispersion solution which can be produced by the above-mentioned method includes the fine metal particles comprising two or more metals selected from the group consisting of Au, Pt, Ir, Pd, Ag, Rh, Ru, Os, Re and Cu wherein when the dispersion solution is centrifuged at two or more different gravitational acceleration values, the metal composition ratio of a filtrate is substantially the same as that of a precipitate at any gravitational acceleration (the difference is within a range of 6%).

According to a second aspect of the present invention, an Ag—Pd fine particle-dispersion solution produced by the above-mentioned method is also characterized in that when the dispersion solution is centrifuged at two or more different gravitational acceleration values, the metal composition ratio of a filtrate is substantially the same as that of a precipitate at any gravitational acceleration (the difference is within the range of 6%). The primary mean particle size of the Ag—Pd fine particles is preferably up to 50 nm, more preferably up to 30 nm, most preferably from 1 to 15 nm. The metal composition ratio of the fine particles is preferably a weight ratio of Pd/(Pd+Ag) of from 0.001 to less than 1, more preferably from 0.15 to 0.6.

The above-mentioned Ag—Pd fine particle-dispersion solution is quite useful for forming a transparent conductive film for Braun tubes of a computer and/or TV and is able to form a transparent conductive film which is excellent in durability such as a thermal resistance, humidity resistance, chemical resistance and weather resistance (ultraviolet rays resistance) more than a transparent conductive film formed from a silver colloid.

While a transparent film produced by the fine metal particle-dispersion of the first aspect of the present invention is available by mixing directly the solution with a proper binder (for example, water-soluble organic resin) and coating the mixed solution on a proper base such as a Braun tube, a preferable method is that the fine metal particle-dispersion solution as it is, is coated on a base, and dried, thereby forming a film comprising the fine metal particles, followed by coating a proper binder solution on the film (overcoat). The binder solution penetrates into the voids of the underlayer of the fine metal particle-film, thereby binding the fine metal particles and at the same time, as the residual binder solution which does not penetrate forms an upperlayer film having no fine metal particles, with the result of forming a two layer film comprising the underlayer of fine metal particles and the upperlayer of a transparent film.

Non-limiting examples of a binder used for the overcoat includes organic binders such as polyester resin, acrylic resin, epoxy resin, melamine resin, urethane resin, butyral resin and ultraviolet rays-setting resin, and inorganic binders such as metal alkoxides of silicon, titanium, zirconium or the like, or hydrolysates thereof (for example, silica sol), silicone monomer, and silicone oligomer.

It is preferable that the binder can form a transparent film having a refractive index lower than that of the underlayer of the fine metal particles film. This constitution provides the two layer film with a low refractive index with the result that the base is provided with an antistatic property and electromagnetic-wave sealing property as well as an anti-glare property. The more preferable binder is a silica-precursor (for example, alkoxysilanes and hydrolysates thereof-for example, silica sol) which can form a silica-like film.

The Ag—Pd fine particle-dispersion solution of the second aspect of the present invention which may be produced in the same manner as the fine metal particle-dispersion solution of the first aspect of the present invention can be used for the coating solution for forming a transparent film of the present invention as it is or after a concentration adjustment by a proper method (for examples, adding water and/or an water-soluble organic solvent, or evaporating). This coating solution does not require any binder, and the coating solution (the Ag—Pd fine particle-dispersion solution, that is, a metal colloid) can be used as it is for coating since the binder is not necessary when the coating solution is used for forming the underlayer film of the above-mentioned two layer film.

With regard to a coating solution having a binder for forming a transparent film, the coating solution can be provided by mixing a proper binder and the Ag—Pd fine particle-dispersion solution produced by the above-mentioned method. The binder may include any one of an organic binder and an inorganic binder. While the preferable organic binders are aqueous organic resins (water-soluble resin and emulsion resin, for examples, acrylic group, epoxy group, urethane group) when a dispersion medium of the dispersion solution is water, non-aqueous resins can also be used by changing the dispersion medium.

The inorganic binder includes binders which can form a silica type film after drying or baking, for examples, silica sol, alkoxysilanes, silane coupling agents and partial-hydrolysates thereof. Inorganic binders such as alkoxides and titanate coupling agents of titanium and zirconium can be also used which form a film of another kind of metal oxide.

A conductive film having Ag—Pd fine particles and having a low enough resistance to provide an electromagnetic wave sealing property can be provided by coating on a base the coating solution having a binder for forming a conductive film of the present invention, followed by drying and/or baking at a proper temperature according to the binder. While this conductive film is provided with a transparency of at least 50% in term of a transmissivity of total visible rays when the film is thinner than 50 nm, the film does not look transparent in appearance due to reflected light inherent in a metal film having a high refractive index. Accordingly, this conductive film is not optimally used for a Braun tube and a CRT which require an apparent transparency. However, the conductive film is useful for uses indifferent to the reflected light, for examples, uses in a window glass and an automobile glass for protection from electrification and for electromagnetic wave-sealing and in forming a transparent electrode. A wide application of the conductive film of the present invention can be considered other than the above-mentioned application, for examples, applications for a solar cell, heat rays reflection, radio absorption and the like can be considered.

In case of providing electromagnetic-sealing property to a Braun tube and a CRT, the above-mentioned two layer film is applied. That is, the coating solution for forming a conductive film of the present invention is coated on a base, followed by drying the coated film to form a underlayer film having the AgPd fine particles. Then, the overcoating treatment is carried out using a proper binder solution which can form a transparent film having a refractive index lower than that of the underlayer film. While the coating solution used in this case may include a binder, it is preferable that the coating solution does not include the binder. That is, in this case, the above-mentioned dispersion solution having Ag—Pd fine particles is used for coating as it is (after concentration adjustment if necessary), followed by vaporizing the solvent to form a film consisting essentially of the Ag—Pd fine particles and having no binder. While any coating method may be used, a spin coating method is preferable.

A proper binder solution which can form a transparent film having a refractive index lower than that of the underlayer film is overcoated on the underlayer of the Ag—Pd fine particles film. The coating in this case can be carried out by spin coating. The overcoated binder solution penetrates into voids existing between the fine particles of the underlayer of the AgPd film, thereby binding the Ag—Pd fine particles. The residual binder solution which does not penetrate stays on the underlayer and forms the upperlayer of a transparent film having a low refractive index.

When the underlayer of Ag—Pd fine particles film is provided with a high refractive index and the upperlayer is provided with a low refractive index, a reflected light from the surface of the upperlayer film becomes low-reflective as the reflected light from the upperlayer is dissipated due to interference with a reflected light from the surface of the underlayer film having the high refractive index and as a result, the reflective light inherent in metallic films becomes inconspicuous with the result of formation of a substantially transparent conductive film having a low reflectance and a low resistance. The binder used for the overcoat includes any organic and inorganic binder exemplified in the first aspect of the present invention.

The preferable binder for the overcoat is a silica precursor which can form a silica type film after drying or baking. A silica-precursor solution is exemplified by a solution (the preferable solvent is alcohol) of silica sol or hydrolyzable silicon compound (for example, alkoxysilanes and partial hydrolysates thereof). The silica type film hardly gets scratched by virtue of having a high hardness, and has a high transparency (visible radiation transmissivity).

With regard to the preferable thickness of the two layer film, the underlayer film having Ag—Pd fine particles is up to 50 nm, more preferably from 15 to 40 nm and the upperlayer of silica type film is from 10 to 200 nm, more preferably from 50 to 150 nm. The baking treatment is carried out as the final step after coating two layers. The temperature of baking is up to 250° C., preferably up to 200° C., more preferably up to 180° C. for protection from the drop of a phosphor, the change of vacuum pressure, the change of measurement accuracy, the corrosion of an electron gun due to an acid gas generation. A conductive film having a low resistance required for electromagnetic wave-sealing can be formed by the coating solution for forming a conductive film of the present invention even if the baking temperature is as low as mentioned-above, as the coating solution does not include any added protective colloid comprising an organic polymer to make it possible to remove the organic materials substantially completely by baking at such a low temperature.

In case of forming the underlayer of fine metal particles film by using the Ag—Pd fine particle-dispersion solution of the present invention, the two layer conductive film having a low resistance and a low reflectivity can be obtained, which is excellent in corrosion resistance, weather resistance, thermal resistance, etc., has a uniform film composition, keeps a high conductivity for a long time and hardly peels off the film, as compared with the conventional case which has an Ag colloid.

In detail, with regard to the low-reflective and low-resistant multi-layers conductive film having the two layers comprising the underlayer of the Ag—Pd fine particles including Ag and Pd and the upperlayer of the silica type film, the initial surface resistance is a degree of from $10^2$ to $10^3\Omega/\square$ and each surface resistance almost does not change from the initial surface resistance and is up to 2 times of the initial surface resistance at the worst, preferably up to 1.5 times and in most cases up to 1.2 times after any one of a thermal resistance test at 250° C. for 24 hours, a humidity resistance test at 60° C. for 10 days under a relative humidity of 80% and a weather resistance test for 10 days under UV irradiation at a distance of 1 cm from a black light. In addition, the surface resistance is up to 2 times of the initial surface resistance, preferably up to 1.5 times like the above-mentioned results after any of a chemical resistance test comprising dipping in an aqueous solution of 2% hydrogen peroxide at a room temperature for 5 hours and a chemical resistance test comprising dipping in a solution of 0.1 N hydrochloric acid at a room temperature for 5 hours, and the film properties do not change.

With the two layer film having an underlayer comprising the conventional Ag—Pd fine particles precipitated in air, each surface resistance after the above-mentioned tests increase remarkably (for example, to a degree of $10^7\Omega/\square$) even if the initial surface is as low as that of the present invention and the conductivity required for sealing electromagnetic waves is lost.

The base may be the image display parts of image display devices other than a Braun tube and CRT (for examples, plasma displays, EL displays and liquid crystal displays).

Incidentally, the above-mentioned transparent film having one or two layers can be produced using a fine metal particle-dispersion produced by precipitating the fine metal particles comprising one or more metals other than Ag—Pd according to the method of the present invention. However, the cases of metals other than Ag—Pd can not exhibit as excellent properties as the Ag—Pd.

EXAMPLES

Example 1

Each metal salt solution was prepared by dissolving in deionized water, a metal salt selected from the following list.

Au: chlorogold acid,
Pt:platinous chloride,
Ir:iridium trichloride,
Pd:palladium nitrate,
Ag:silver nitrate,
Rh:potassium rhodium hexachloride,
Ru:ruthenium trichloride,
Os:osmium trichloride,
Re:rhenium trichloride,
Cu:copper sulfate Independently, aqueous solutions of reduction agent including citrate ions and ferrous ions in a molar ratio of 3 to 2 were prepared by dissolving directly granular ferrous sulfate in an aqueous solution of 26% sodium citrate at the temperatures shown in Table 1 under a nitrogen stream which was arranged by dissolving sodium citrate in deionized water.

Each one of the above-mentioned metal salt solutions is dripped into each aqueous solution of reduction agent respectively which was kept at each temperature described above under the nitrogen gas flow while stirring at 100 rpm, thereby mixing the metal solution and the aqueous solution of reduction agent. When two kinds of metal salt solutions were added, a mixed metal salt solution having two kinds of metal salts which was prepared in advance by mixing two metal salt solutions so as to provide a mixing ratio (wt. %) shown in Tables 1-1 and 1-2 was added to the aqueous solution of reduction agent. In any case, a concentration of each metal salt solution is adjusted to provide the metal salt solution with an amount of up to 1/10 relative to the aqueous solution of reduction agent such that the reaction temperature could be kept at a predetermined temperature even in case of dipping metal salt(s) solution having a room temperature.

The mixing ratio of both solutions was set such that citrate ions and ferrous ions in the aqueous solution of the reduction agent were provided to each have from 0.5 to 6 times in term of molar ratio relative to the total valence numbers of metals ions included in the metal salt(s) solution. After dripping the metal salt(s) solution, the stirring was continued for 15 minutes, thereby producing each dispersion solution having fine metal(s) particles. The dispersion solutions were within a range of from 3 to 9 in term of pH and were within a range of from 2 to 60 g/L in term of stoichiometric amount of metal formation.

The produced dispersion solution was left as it was at a room temperature, the sedimented particles were separated by decantation and deionized water was added to the separated particles to produce a dispersion material, followed by adding an ionized water thereto, thereby producing a fine metal particle dispersion solution including a metal content of 4% by weight. The dispersion solution was from 3.2 to 8.0 in terms of pH and up to 2 mS/cm in term of electric conductivity. The mean particle size of the fine metal particles in the dispersion solution were measured by actually surveying 100 pieces of the particles using TEM photograph. Though the particle size distribution was not measured, in any case the particle sizes were very uniform and particles of more than 90% had a mean particle size within a range of ±20% relative to a mean particle size.

In case of fine metal particles including two or more kinds of metals, the total metal composition ratio after desalting and re-dispersing treatment were measured by ICP spectrometory (inductively coupled high-frequency plasma spectrometory) on samples which were sampled after a sufficient stirring. In addition, a part of the dispersion solution was centrifuged at a gravitational acceleration shown in Table 1 for 5 minutes, after adding thereto an electrolyte in some cases (adding 30 wt. % sodium nitrate solution in an amount of 0.2% relative to a colloid by weight to the dispersion solution) and the metal composition ratios of the obtained filtrate and precipitation were analyzed in the same manner as mentioned-above, the results of which were shown also in Table 1.

To make a comparison, fine metal particle-dispersion solutions including Ag and Pd were prepared in the same manner as in the examples mentioned-above except that the adjustment of an aqueous solution of reduction agent and mixing of an aqueous solution of metal salt(s) and the aqueous solution of reduction agent both were carried out in air, the results of which were shown also in Table 1.

TABLE 1-1

| | | Metal composition ratio by weight | | Mixing and reaction condition | | | | Property of fine particle dispersion solution | | Result of centrifugation examination | | | | |
|---|---|---|---|---|---|---|---|---|---|---|---|---|---|---|
| Sample Nos. | Kind of metal(s) | Mixing ratio | in dispersion solution | Atmosphere | Temperature (° C.) | pH | Amount of stoichiometric metric formation (g/L) | Particle size (nm) | pH | Electrolyte addition | Condition × G | Metal composition ratio by weight Filtrate | Precipitate | Notes |
| 1 | Ag/Pd | 96/4 | 95.8/4.2 | Nitrogen | 60 | 5.0 | 15 | 5 | 5.6 | None | 1000 | 95.7/4.3 | 95.5/4.5 | |
| 2 | | | | | | | | | | | 1500 | 95.5/4.5 | 96.0/4.0 | |
| 3 | | 90/10 | 90.3/9.7 | Nitrogen | 42 | 5.0 | 40 | 10 | 5.4 | None | 1500 | 90.0/10.0 | 90.2/9.8 | |
| 4 | | 80/20 | 81.0/19.0 | Nitrogen | 41 | 5.0 | 20 | 8 | 5.1 | None | 1000 | 80.2/19.8 | 81.0/19.0 | |
| 5 | | | | | | | | | | | 1500 | 81.1/18.9 | 80.2/20.8 | |
| 6 | | | 80.5/19.5 | | 59 | 5.0 | 20 | 10 | 4.7 | None | 1000 | 81.1/18.9 | 80.1/19.9 | |
| 7 | | | | | | | | | | | 1500 | 80.8/19.2 | 79.8/20.2 | |
| 8 | | 75/25 | 75.8/24.2 | Nitrogen | 26 | 5.0 | 5 | 4 | 5.8 | None | 1500 | 75.8/24.2 | 75.3/24.7 | |
| 9 | | 70/30 | 70.9/29.1 | Nitrogen | 95 | 5.0 | 30 | 10 | 3.5 | None | 1500 | 71.0/29.0 | 69.8/30.2 | |
| 10 | | 60/40 | 60.8/39.2 | Nitrogen | 40 | 5.0 | 10 | 5 | 4.6 | None | 1500 | 60.9/39.1 | 59.8/40.2 | |
| 11 | | 50/50 | 56.5/43.5 | Nitrogen | 42 | 5.5 | 20 | 5 | 5.0 | None | 500 | 56.6/43.4 | 55.3/44.7 | |
| 12 | | | | | | | | | | | 1000 | 56.4/43.6 | 57.4/42.6 | |
| 13 | | | | | | | | | | | 1500 | 55.9/44.1 | 55.2/44.8 | |
| 14 | | | | | | | | | | 30 wt % | 500 | 55.6/44.4 | 55.3/44.7 | |
| 15 | | | | | | | | | | $NaNO_3$ | 1000 | 56.2/43.8 | 56.0/44.0 | |
| 16 | | | | | | | | | | | 1500 | 56.1/43.1 | 55.9/44.1 | |
| 17 | | | 53.6/46.4 | Nitrogen | 60 | 5.5 | 20 | 6 | 4.8 | None | 1500 | 52.5/46.5 | 52.3/47.7 | |
| 18 | | | 43.9/56.1 | Nitrogen | 79 | 5.5 | 20 | 6 | 4.7 | None | 1500 | 43.5/56.5 | 44.0/56.0 | |
| 19 | | | 61.6/38.4 | Air | 40 | 5.5 | 20 | 12 | 4.8 | None | 500 | 62.4/37.6 | 59.8/40.2 | Comparative |
| 20 | | | | | | | | | | | 1000 | 67.0/33.0 | 55.0/45.0 | Comparative |
| 21 | | | | | | | | | | | 1500 | 73.5/26.5 | 47.1/52.9 | Comparative |
| 22 | | | | | | | | | | 30 wt % | 500 | — | — | Comparative |
| 23 | | | | | | | | | | $NaNO_3$ | 1000 | — | — | Comparative |
| 24 | | | | | | | | | | | 1500 | — | — | Comparative |
| 25 | | 40/60 | 39.2/60.8 | Nitrogen | 40 | 5.5 | 20 | 8 | 5.0 | None | 1500 | 39.6/60.5 | 38.8/61.2 | |
| 26 | | 30/70 | 28.5/72.5 | Nitrogen | 45 | 5.5 | 15 | 10 | 5.2 | None | 1500 | 29.0/71.0 | 28.4/71.6 | |
| 27 | | 99.9/0.1 | 99.1/0.1 | Nitrogen | 30 | 5.5 | 20 | 10 | 4.8 | None | 1500 | 99.9/0.1 | 99.9/0.1 | |

TABLE 1-1

| Sample Nos. | Kind of metal(s) | Metal composition ratio by weight: Mixing ratio | Metal composition ratio by weight: in dispersion solution | Mixing and reaction condition: Atmosphere | Mixing and reaction condition: Temperature (° C.) | Mixing and reaction condition: pH | Mixing and reaction condition: Amount of stoichiometric formation (g/L) | Property of fine particle dispersion solution: Particle size (nm) | Property of fine particle dispersion solution: pH | Result of centrifugation examination: Electrolyte addition | Result of centrifugation examination: Condition × G | Result of centrifugation examination: Metal composition ratio by weight: Filtrate | Result of centrifugation examination: Metal composition ratio by weight: Precipitate | Notes |
|---|---|---|---|---|---|---|---|---|---|---|---|---|---|---|
| 28 | Pd/Au | 50/50 | 49.0/51.0 | Nitrogen | 60 | 5.8 | 2 | 11 | 5.8 | None | 1500 | 48.2/51.8 | 49.5/50.5 | |
| 29 | Pt/Au | 50/50 | 45.0/55.0 | Nitrogen | 55 | 6.0 | 5 | 12 | 5.5 | None | 1500 | 46.1/53.9 | 44.9/55.1 | |
| 30 | Ag/Au | 80/20 | 78.5/21.5 | Nitrogen | 53 | 5.5 | 5 | 6 | 5.4 | None | 1500 | 78.8/21.2 | 79.0/21.0 | |
| 31 | Ag/Ru | 80/20 | 79.0/21.0 | Nitrogen | 67 | 4.9 | 5 | 7 | 4.8 | None | 1500 | 79.7/20.3 | 78.5/21.5 | |
| 32 | Ag/Cu | 50/50 | 46.9/53.1 | Nitrogen | 56 | 5.6 | 5 | 7 | 5.0 | None | 1500 | 47.4/52.6 | 46.5/53.5 | |
| 33 | Pd/Pt | 80/20 | 81.9/18.1 | Nitrogen | 55 | 6.1 | 5 | 6 | 4.6 | None | 1500 | 80.4/19.6 | 78.8/21.2 | |
| 34 | Pd/Cu | 50/50 | 46.8/53.2 | Nitrogen | 60 | 6.3 | 5 | 8 | 4.8 | None | 1500 | 47.5/52.5 | 48.0/52.0 | |
| 35 | Pt | — | — | Nitrogen | 50 | 6.0 | 10 | 3 | 4.5 | — | — | — | — | |
| 36 | Au | — | — | Nitrogen | 60 | 5.4 | 5 | 4 | 4.7 | — | — | — | — | |
| 37 | Ir | — | — | Nitrogen | 40 | 5.6 | 5 | 4 | 4.4 | — | — | — | — | |
| 38 | Ag | — | — | Nitrogen | 30 | 5.8 | 15 | 6 | 5.5 | — | — | — | — | |
| 39 | | — | — | Air | 30 | 5.4 | 15 | 25 | 5.1 | — | — | — | — | Comparative |
| 40 | Pd | — | — | Nitrogen | 60 | 5.6 | 10 | 8 | 5.4 | — | — | — | — | |
| 41 | | — | — | Air | 60 | 5.5 | 10 | 28 | 4.5 | — | — | — | — | Comparative |
| 42 | Rh | — | — | Nitrogen | 40 | 6.1 | 5 | 6 | 4.7 | — | — | — | — | |
| 43 | Ru | — | — | Nitrogen | 35 | 5.4 | 5 | 8 | 5.6 | — | — | — | — | |
| 44 | Os | — | — | Nitrogen | 40 | 5.7 | 10 | 4 | 4.8 | — | — | — | — | |
| 45 | Cu | — | — | Nitrogen | 46 | 5.3 | 5 | 9 | 4.9 | — | — | — | — | |
| 46 | Re | — | — | Nitrogen | 38 | 5.5 | 5 | 5 | 5.2 | — | — | — | — | |

As is clear from Table 1, a high quality of fine metal particle-dispersion solutions were available which had a mean particle size of several nm to several tens of nms and a uniform particle size in any kind of metal or any combination of metals. In contrast, the comparative samples produced by mixing in air showed fine metal particles having a mean particle size much larger than the samples of the present invention in any case of Ag—Pd, Ag and Pd.

The fine metal particle-dispersion solutions including two or more kinds of metals are especially worth attention. In cases of the comparative samples in which the aqueous solution of metal salt and aqueous solution of reduction agent were mixed in air as conventionally, the analyzed metal ratio was remarkably different between a filtrate and precipitate responding to each case at any gravitational acceleration of 500, 1,000 and 1,500×G and at that, both the analyzed values of the filtrates and precipitates varied when the gravitational acceleration changed. For examples, with regard to the Ag—Pd group shown in Table 1-1, each comparison on the metal ratios of the filtrate and precipitate at the same gravitational acceleration demonstrated that Ag was contained in the filtrate more than in the precipitate and Pd was contained in the precipitate more than in the filtrate, and an amount of Ag increased in the filtrate and in contrast an amount of Pd increased in the precipitate with the increase of gravitational acceleration. This result means that the Ag and Pd precipitated separately and the results of centrifugation mentioned-above may be due to the difference of surface condition and oxidized condition between Ag particles and Pd particles. At any rate, the metal ratio was different between the filtrate and precipitate, and any one of the filtrate and precipitate varied with respect to the metal ratio according to gravitational acceleration values.

When different kinds of metals thus precipitate separately and the fine metal particle-dispersion solution is used as a coating material, the fine metal particles move and fine metal particles comprising the same kinds of metals are easy to gather with the result that a film having a nonuniform distribution of each metal is formed and a film having uniform and stable properties is not available.

In contrast to this, in cases of the samples of the present invention in which the aqueous solution of metal salts and the aqueous solution of reduction agent were mixed in a nitrogen atmosphere in accordance to the present invention, the analyzed metal ratio of the filtrate and precipitate responding to each sample was almost the same even when centrifuged at any gravitational acceleration of 500, 1,000, 1,500×G and the change of the metal ratio was small even when the gravitational acceleration was changed. And that, the metal ratio was almost the same as that of metals included the aqueous solution of metal salts which was used for reduction. This result means that each metal particle alloyed and the metal constitution of the particles was uniform. Accordingly, a film is available which has an homogeneous distribution of each metal thereby to obtain stable and uniform film properties.

In general, identification of an element and a state of atomic bond can be analyzed by analyzing a supermicro area of 0.5 nm to several atoms using a probe of several nm in field emission electron microscope (JEM-2010F from Nippon Denshi Corp.)

Figure 6A:
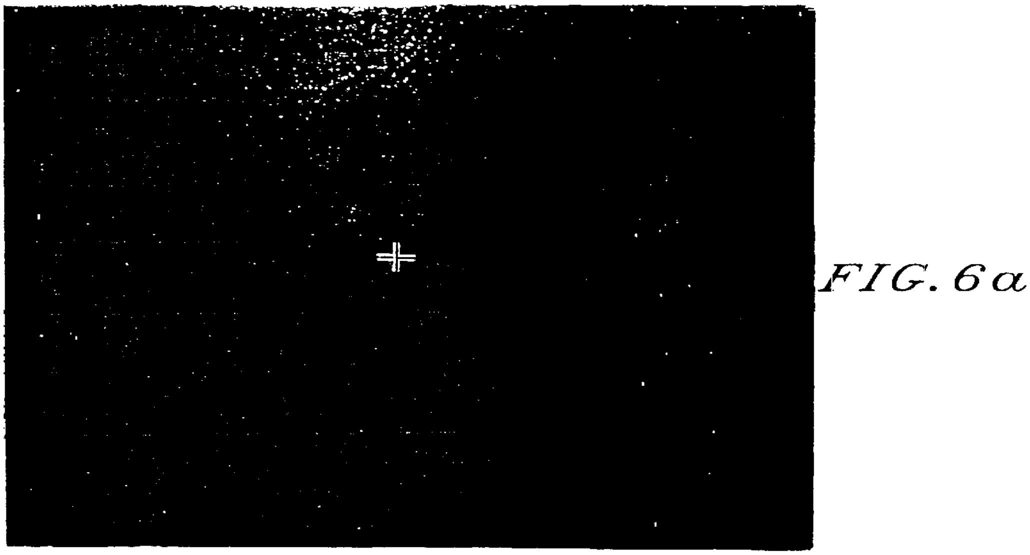
FIG. 6.
Figure 6B:
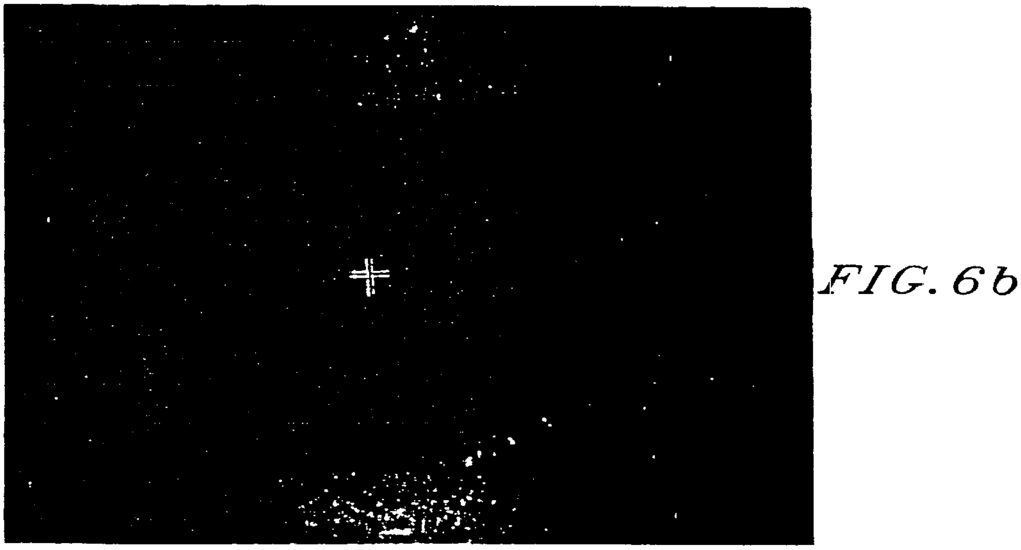
Figure 6C:
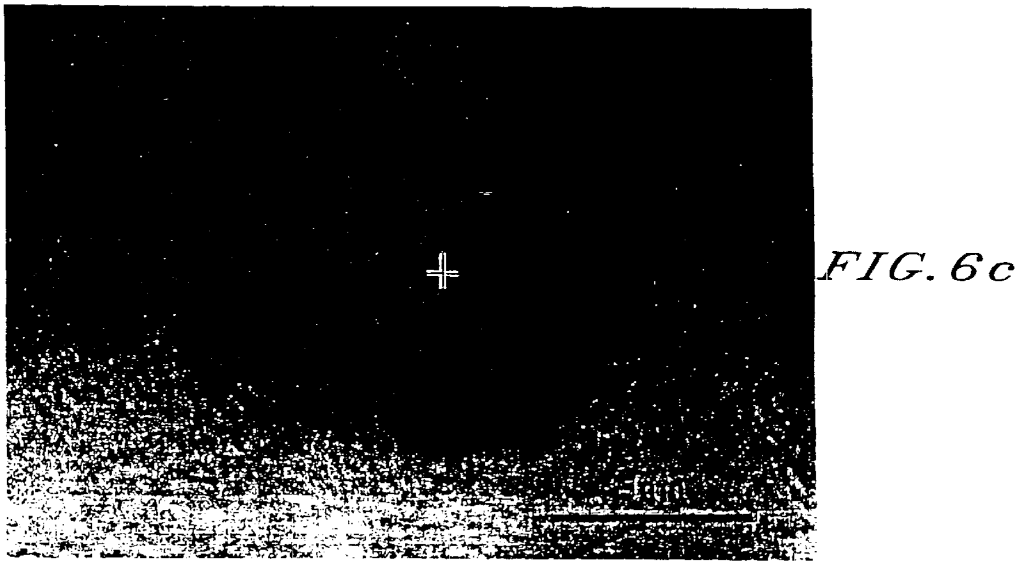

In order to make a confirmation of the presence of alloying, a beam of 2 nm was irradiated on three spots with regard to three particles of sample No.2 (one spot per particle) [FIGS. 6(*a*), (*b*), (*c*)] and elements were identified by the field emission electron microscope. As a result, Ag and Pd were confirmed to alloy as both Ag and Pd were detected in a same particle as shown in [FIGS. 7(*a*), (*b*), (*c*)].

Example 2

The samples and comparative samples prepared in the same manner as in Example 1 with regard to Ag—Pd fine particle-dispersion solution were diluted with a mixed solvent of ethanol/1-methoxy-2-propanol (90/10) and then two layer films were prepared by the method mentioned hereinunder using the diluted dispersion solutions as a coating solution for forming a conductive film. In some cases, two different Ag—Pd fine particle-dispersion solutions were prepared which include a metal content of 0.32% and 0.28% by weight respectively, followed by forming two kinds of films having the same metal ratio and different resistivity each other (Samples Nos.11 and 12, 15 and 16).

After a glass base having 100 mm×100 mm×2.8 mm thickness was preheated at 40° C. in an oven, the base was set in a spin coater and rotated at 150 rpm while 2 cc of a Ag—Pd fine particle-dispersion solution was dripped thereon, followed by rotating the base for 90 secs. After that, the base was heated again at 40° C. in the oven, a silica-precursor solution for forming a upperlayer was spin-coated using the same condition, followed by heating at 160° C. for twenty minutes in the oven, thereby to form on the base, a two layer film having an underlayer of Ag—Pd film and an overlayer of silica type film.

The silica-precursor solution used for forming the upper-layer was prepared by diluting a silica coating solution (trade name:silica coat solution SC-100 from Mitusbishi Materials Corp., a silica sol having a concentration of 1.00% by weight in term of $SiO_2$) with methanol into 0.70% by weight in term of $SiO_2$.

To make a comparison, silver fine particle-dispersion solutions and palladium fine particle-dispersion solutions were prepared by mixing two solution in a nitrogen stream or an air stream in the same manner as in the Ag—Pd fine metal particle dispersion solutions of Example 1, except that metal salt solutions consisting of a silver salt (silver nitrate) or a palladium salt (palladium nitrate) were used. In addition, dispersion solutions having silver fine particles and palladium fine particles were prepared by mixing the silver fine particle dispersion solution and palladium fine dispersion-solution. Two layer films were formed in the same manner as mentioned above, using the dispersion solutions having Ag fine particles and Pd fine particles.

An initial film-forming ability in the film-forming treatment mentioned-above was evaluated according to eyes observation and the results were indicated as follows.

○: good (no nonuniformity, flip, and light spot),

Δ: inferior in some degree (partial nonuniformity, flip and light spot),

X: inferior (nonuniformity, flip, and light spot on the whole).

All the obtained conductive films were confirmed to be two layer films each comprising an underlayer of a fine metal particle film and an upperlayer of a silica film by observing a cross section of the obtained conductive film with SEM. The film thickness was within a range of about 8 to 10 nm with regard to the underlayer and was within a range of about 60 to 160 nm with regard to the upperlayer.

A surface resistance of the two layer film was determined by 4 probes method (Roresta AP from Mitsubishi Yuka Corp.) and a visible radiation transmissivity was measured with a self-registering spectrophotometer (U-4000 from Hitachi Seisakusho Corp.). The visible radiation transmissivity was measured at 550 nm since the visible radiation transmissivity at 550 nm has been experientially found to coincides with whole visible radiation transmissivity.

The following examinations were carried out on the glass bases on which the two layer film was formed (each 5 pieces of size 10 mm×10 mm×2.7 mm were prepared by the same condition of spin coating).

① thermal resistance test comprising heating a sample at 250° C. in air for 24 hours using an oven at 250° C.;

② humidity resistance test comprising leaving a sample for 10 days in a thermostatic chamber having a temperature of 60° C. and a relative humidity of 80%;

③ weather resistance test comprising irradiating on a sample for 10 days a black light (FL20S-BLB from Toshiba) which is the sources of ultraviolet-rays at a distance of 1 cm from the sample;

④ chemical resistance test A comprising dipping a sample in an aqueous solution of 2% hydrogen peroxide solution at a room temperature for 5 hours;

⑤ chemical resistance test B comprising dipping a sample in a solution of 0.1 N hydrochloric acid at a room temperature for 5 hours.

After each test, the surface resistance of the two layer film was measured as mentioned-above. With regard to the samples which were examined on the chemical resistance test A and B, the surface of the conductive film was observed with SEM to check a change of surface appearance (whitening, stain, peeling). With regard to some of the samples, the surface of the sample was observed with SEM before test and at one hour passing after the thermal resistance test to survey a fine structure of Ag—Pd fine particles film.

All the above-mentioned measurements and results are listed in Table 2 and some of the above-mentioned SEM photographs are attached.

Figure 1B:
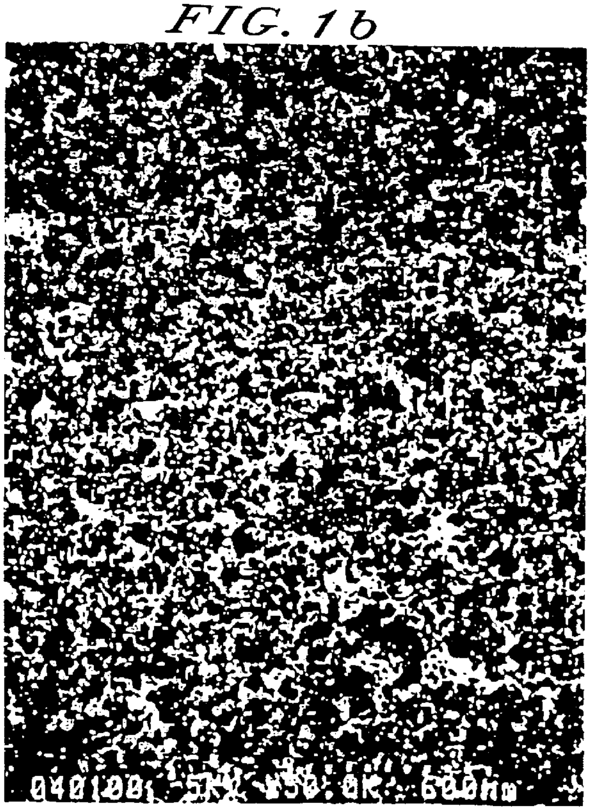
Figure 2A:
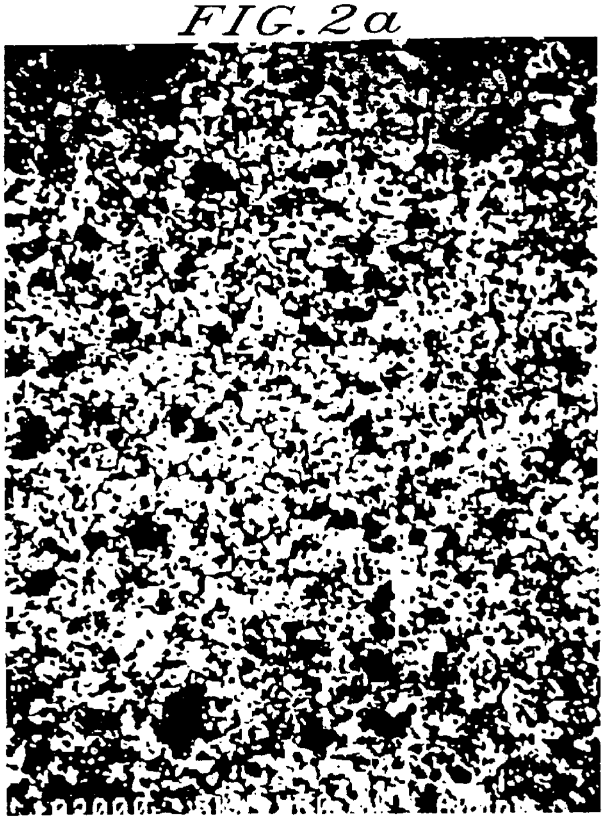
FIG. 2 is SEM photographs demonstrating an initial microstructure and a microstructure after heating corresponding to FIG. 1 in case of a two layer film having a underlayer film formed by using a coating solution for forming a conductive film which includes Ag—Pd fine particles of the comparative example.
Figure 2B:

While FIGS. 1 and 2 are photographs of two layer films, both of them comprise an underlayer, the Ag—Pd particles of the same Ag—Pd ratio of 50 by 50, FIG. 1 demonstrates the microstructure of a two layer film produced under the nitrogen atmosphere in the mixing step (sample No. 12) and FIG. 2 demonstrates the microstructure of the two layer film produced under the air atmosphere (Sample No. 16). "(a)", and "(b)" of the photographs demonstrate a fine structure at an initial stage and a fine structure after one hour heating at 250° C. respectively. The magnification is 50,000 in the four photographs. White-like parts and black parts in the photographs are fine metal particles and matrixes respectively. All these two layer films exhibited a degree of $10^3 \Omega/\square$ in term of initial surface resistance.

Figure 3:
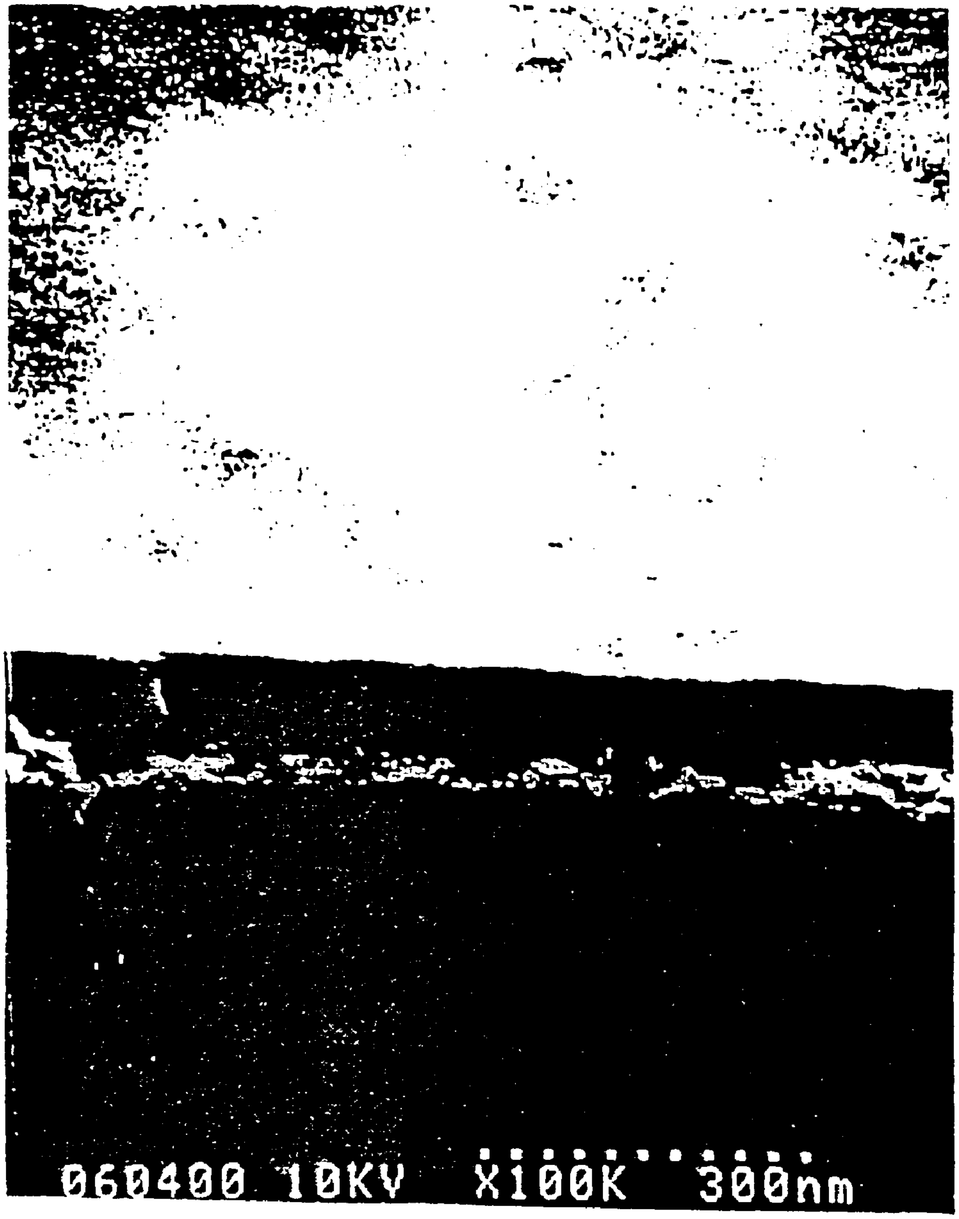
FIG. 3 is a SEM photograph demonstrating a surface of a two layer film after a dipping test in a hydrogen peroxide solution, the film comprising an underlayer film formed by using a coating solution for form ing a conductive film which includes Ag—Pd fine particles of the present invention and an upperlayer film of a silica-type material.

FIG. 3 is a SEM photograph having 100,000 magnifications and demonstrating the surface of a two layer film having the fine metal particles of the underlayer comprising the Ag—Pd fine particles of the sample No. 12 of the present invention after the chemical resistance test A (dipping in hydrogen peroxide), the surface being observed from the upper side obliquely.

Figure 4A:
FIG. 4 is a SEM photograph demonstrating a surface of a two layer film after a clipping test in a hydrogen peroxide solution corresponding to FIG. 3, the film having an underlayer film which comprises fine metal particles of Ag.
Figure 4B:

FIG. 4 is SEM photographs demonstrating the surface of the two layer film of sample No. 1 having the underlayer of the fine metal particles comprising Ag—Pd particles precipitated by mixing and reacting in the air stream after the same chemical resistance test A as mentioned-above. "(a)" and "(b)" are 50,000 and 500,000 magnifications respectively.

Figure 5A:
FIG. 5 is SEM photographs demonstrating a surface of a two layer film after a dipping test in a hydrogen peroxide solution corresponding to FIG. 3, the film having an underlayer film which comprises fine metal particles of Ag—Pd fine particles of the comparative example.
Figure 5B:
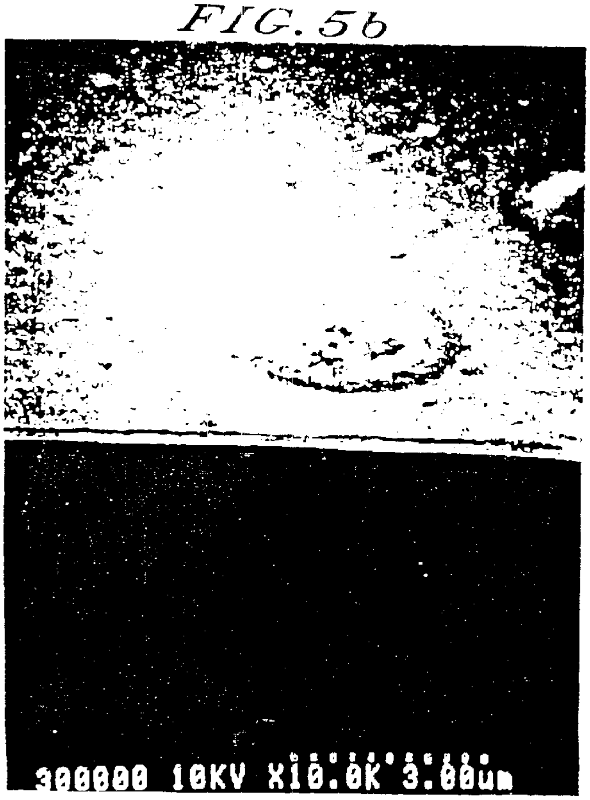

FIG. 5 is SEM photographs demonstrating the surface of Sample No. 16 having the underlayer of the fine metal particles comprising Ag—Pd particles precipitated by mixing and reacting in the air stream after the same chemical resistance test A as mentioned-above. "(a)" and "(b)" are 50,000 and 100,000 magnifications respectively.

TABLE 2

| Sample Nos. | Kind of metal(s) by weight | Mixed metal ratio | Atmosphere to mixing | Reaction temperature | Initial film-forming | Surface resistance after thermal resistance test: Initial value Ω/□ | Surface resistance after thermal resistance test: After test Ω/□ | Surface resistance after humid resistance test: Initial value Ω/□ | Surface resistance after humid resistance test: After test Ω/□ | Surface resistance after weather resistance test: Initial value Ω/□ | Surface resistance after weather resistance test: After test Ω/□ |
|---|---|---|---|---|---|---|---|---|---|---|---|
| 1 | Ag | 100 | Air | 39 | Δ | 574 | 9675645 | 687 | 10'~ | 551 | 7893212 |
| 2 | Pd | 100 | Air | 41 | X | 8542 | 35543 | 7886 | 45590 | 5875 | 67650 |
| 3 | Ag + Pd[1] | 50/50 | Air | — | X | 44635 | 10'~ | 49987 | 10'~ | 45619 | 10'~ |
| 4 | Ag | 100 | Nitrogen | 40 | Δ~○ | 421 | 10'~ | 398 | 430 | 389 | 397 |
| 5 | Pd | 100 | Nitrogen | 38 | Δ | 2075 | 5678 | 4453 | 6453 | 4554 | 4554 |
| 6 | Ag + Pd[2] | 50/50 | Nitrogen | — | Δ | 85632 | 10'~ | 79883 | 10'~ | 78712 | 10'~ |
| 7 | Ag/Pd | 80/20 | Nitrogen | 41 | ○ | 473 | 488 | 429 | 429 | 489 | 489 |
| 8 | | 75/25 | Nitrogen | 25 | ○ | 289 | 489 | 310 | 352 | 301 | 312 |
| 9 | | 70/30 | Nitrogen | 95 | ○ | 337 | 376 | 328 | 330 | 849 | 360 |
| 10 | | 60/40 | Nitrogen | 40 | ○ | 275 | 281 | 268 | 277 | 287 | 291 |
| 11 | | 50/50 | Nitrogen | 42 | ○ | 211 | 257 | 207 | 214 | 252 | 244 |
| 12 | | | | | ○ | 2282 | 2563 | 2657 | 2853 | 2388 | 2413 |
| 13 | | | Nitrogen | 60 | ○ | 837 | 884 | 809 | 626 | 765 | 781 |
| 14 | | | Nitrogen | 79 | ○ | 1295 | 1307 | 1269 | 1279 | 1300 | 1321 |
| 15 | | | Air | 40 | X | 354 | 15902 | 299 | 27197 | 378 | 24098 |
| 16 | | | | 40 | X | 1350 | 4520030 | 2088 | 8097880 | 1955 | 5353420 |
| 17 | | 40/60 | Nitrogen | 40 | ○ | 286 | 279 | 291 | 291 | 234 | 234 |
| 18 | | 30/70 | Nitrogen | 45 | ○ | 308 | 311 | 252 | 278 | 326 | 330 |
| 19 | | 99.9/0.1 | Nitrogen | 30 | ○ | 524 | 533 | 509 | 516 | 487 | 503 |

| Sample Nos. | Surface resistance and appearance after chemical resistance test A: Initial value Ω/□ | After test Ω/□ | Appearance | Surface resistance and appearance after chemical resistance test B: Initial value Ω/□ | After test Ω/□ | Appearance | Notes |
|---|---|---|---|---|---|---|---|
| 1 | 478 | 8518455 | Whitening/ Peeling | 10'~ | 10'~ | Whitening/ Peeling | Comparative samples |
| 2 | 5988 | 56544 | No change | 5331 | 21709 | No change | |
| 3 | 49021 | 10'~ | Whitening/ Peeling | 48655 | 10'~ | Whitening/ Peeling | |
| 4 | 408 | 10'~ | Whitening/ Peeling | 411 | 10'~ | Whitening/ Peeling | |
| 5 | 4239 | 6239 | No change | 3877 | 25445 | No change | |
| 6 | 80132 | 10'~ | Whitening/ Peeling | 77211 | 10'~ | Whitening/ Peeling | |
| 7 | 463 | 465 | No change | 452 | 477 | No change | Samples |
| 8 | 351 | 368 | No change | 293 | 307 | No change | |
| 9 | 326 | 677 | No change | 364 | 369 | No change | |
| 10 | 289 | 285 | No change | 285 | 295 | No change | |
| 11 | 255 | 275 | No change | 209 | 214 | No change | |
| 12 | 2786 | 2978 | No change | 2852 | 3076 | No change | |
| 13 | 811 | 616 | No change | 753 | 787 | No change | |
| 14 | 1108 | 1299 | No change | 1238 | 1352 | No change | |
| 15 | 339 | 1647 | Stain | 365 | 7983454 | Whitening | Compar. |
| 16 | 2090 | 7271546 | Stain | 1593 | 10'~ | Whitening/ Peeling | |
| 17 | 306 | 306 | No change | 283 | 308 | No change | Samples |
| 18 | 297 | 305 | No change | 288 | 296 | No change | |
| 19 | 522 | 536 | No change | 536 | 544 | No change | |

Remarks:
[1]Mixtures of Ag fine particles of sample No. 1 and Pd fine particles of sample No. 2.
[2]Mixtures of Ag fine particles of sample No. 4 and Pd fine particles of sample No. 5.

As is clear from Table 2, when the underlayers of a conductive film were formed by the coating solutions for forming a conducting film which include Ag—Pd fine particles precipitated by mixing an aqueous solution of metal salts and an aqueous solution of reduction agent at 25 to 95° C. under a nitrogen atmosphere according to the present invention, the two layer films could be obtained which had a low initial resistance of $10^2$Ω/□ to $10^3$Ω/□ degree and were excellent in transparency having a whole visible radiation transmissivity of at least 65%. The two layer films had hardly any change in the surface resistance and maintained a low resistance after any test of thermal resistance, humidity resistance, weather resistance (ultraviolet rays irradiation), chemical resistance A and chemical resistance B. In addition, according to the SEM observation after each chemical test, the surface had not any changes such as stain, whitening and peeling. One example of the SEM photographs demonstrating the above-mentioned results is shown in FIG. 3.

FIGS. 1(*a*) and (*b*) are SEM photographs demonstrating microstructures of the two layers of sample No. 12 (Ag/Pd fine particles of the present invention which had an Ag/Pd of 50/50 and were precipitated by mixing and reaction at 42° C. under a nitrogen stream) at the initial stage and after heating at 250° C.×1 hour respectively. As is clear from FIG. 1(*a*), the metal fine particles aggregate in the film, form a network structure having a lot of vacant spaces and form conductive lines. As the metal fine particles are not closely packed and visible radiation can pass through the vacant spaces, an excellent visible radiation transmissivity is available which is at least 65%.

In comparison between FIGS. 1(*a*) and (*b*), it is understood that the microstructure after heating at 250° C. for 1 hour did not change from the initial structure and the two layer film is excellent in thermal resistance. As the network (that is, the conductive lines) is maintained after heating, the electric conductivity hardly changes and keeps the same degree of $10^3\Omega/\square$ as that of the initial one.

In contrast, in case of sample No.16 which was prepared by mixing in air, which had the fine metal particles comprising the same metal ratio of Ag/Pd=50/50 and was prepared at the same precipitation temperature of about 40° C. as in sample No.12, the surface resistance increased by double figures and the conductivity decreased remarkably, though the initial resistance was low and the transparency is good both like in sample No.12. In chemical tests, stains appeared in case of hydrogen peroxide test [as referred to FIGS. 5(*a*) and (*b*)] and whitening appeared in many tests in case of hydrochloric acid test.

FIGS. 2(*a*) and (*b*) are SEM photographs demonstrating microstructures of the two layer film of sample No. 16 (Ag/Pd fine particles of the comparative example precipitated by mixing and reaction at 40° C. under air) at the initial stage and after heating at 250° C.×1 hour respectively. As is clear from FIG. 2(*a*), the initial microstructure of the two layer film is a network structure having a lot of vacant places like sample of the present invention shown in FIG. 1(*a*) while the network structure is coarse to some degree. Therefore, there were available a excellent electric conductivity of a degree of $10^3\Omega/\square$ and visible radiation transmissivity of at least 65%.

Referring to FIGS. 2(*b*), the microstructure of the film changed greatly after heating at 250° C.×1 hour and the film is studded with separate coarse particles and the conductive lines are lost. For that reason, the surface resistance increased remarkably.

In addition, as is clear from Table 2, in case of fine metal particles consisting of Ag (that is, silver colloid), the results little depended on an atmosphere used during mixing the two aqueous solutions for Ag precipitation, whether it was an air or nitrogen stream. That is, while the initial surface resistance was good, the surface resistance remarkably increased almost to a degree of $10^7\Omega/\square$ after any test of thermal resistance, humidity resistance, weather resistance, chemical resistance A and chemical resistance B which was not in the least a level enough for an electromagnetic wave-sealing property. Moreover, in chemical tests, the appearance changed, and whitening and peeling were observed in the hydrogen peroxide solution(reference to FIG. 4).

The above-mentioned result could not be expected, which showed that a durability improvement of the two layer film was not available at all by mixing the two solutions under the nitrogen atmosphere in case of Ag fine particles. It is understood that the corrosion resistance and thermal resistance greatly increased because the Ag—Pd fine particles precipitated by the above-mentioned method did not comprise Ag particles and Pd particles which precipitated separately but comprised particles in which Ag and Pd alloyed.

Pd fine particles exhibited the same result of surface resistance as the Ag fine particles except for having an initial surface resistance larger by one figure than the Ag fine particles, and a visible radiation transmissivity of the Pd film was also low. In addition, in case of mixing the Ag fine particles and Pd fine particles in a ratio of 50 to 50 by weight, the initial surface resistance greatly increased to a degree of $10^5\Omega/\square$ whether an atmosphere used during mixing is air or nitrogen. That is, a two layer film having a low resistance of a $10^2\Omega/\square$ to $10^3$ $\Omega/\square$ degree is not available when a coating solution for forming a conductive film is produced using Ag fine particles and Pd fine particles even if both were precipitated under the nitrogen atmosphere, while available in the Ag—Pd fine particles of the present invention.

As described in detail hereinabove, the present invention provides a fine metal particle-dispersion solution (a metal colloid) wherein a high quality of fine metal particles are dispersed which comprise one or more selected from the group consisting of Au, Pt, Ir, Pd, Ag, Rh, Ru, Os, Re and Cu and have a fine mean particle size of from several nm to several tens nm and a uniform particle size, and a method for producing the same.

Particularly with regard to a dispersion solution comprising two or more kinds of metals, the metals are included in an alloyed state and all the fine particles constitute the same metal composition ratio with the result that a transparent conductive film is available which has a constantly uniform distribution of the metals in the film using the dispersion solution and has a stable quality.

Furthermore, the present invention provides a conductive film having a low resistance and low reflectivity which is excellent in durability and which comprises a two layer film comprising the underlayer of an Ag—Pd fine particles film and upperlayer of a silica-type film, wherein an initial surface resistance exhibits a low resistance of a $10^2\Omega/\square$ to $10^3\Omega/\square$ degree enough for electromagnetic wave-sealing and the surface resistance hardly change from the initial surface resistance after any one of thermal resistance test at 250° C. for 24 hours, humidity resistance test at 60° C. under a relative humidity of 80% for 10 days and weather resistance test by UV irradiation for 10 days with a black light. Furthermore, with regard to the chemical test comprising dipping a sample in an aqueous solution of 2% hydrogen peroxide at a room temperature for 5 hours and the chemical comprising dipping a sample in a solution of 0.1N hydrochloric acid at a room temperature for 5 hours, the surface resistance hardly changes and also the film property hardly changes due to any one of the chemical tests. Still furthermore, the present invention provides a method for producing the above-mentioned conductive film having a low resistance and low reflectivity which is excellent in durability and which comprises two layer film comprising the underlayer of an Ag—Pd fine particles film and the upperlayer of a silica-type film. The conductive film is most suitable for providing a Braun tube and CRT with an antistatic property for static electricity, a sealing property for electromagnetic waves and an anti-glare property.

Obviously, numerous modifications and variations of the present invention are possible in light of the above teachings. It is therefore to be understood that within the scope of the appended claims, the invention may be practiced otherwise than as specifically described herein.

This application is based on Japanese Applications Hei 10-259965 and Hei 10-261960 filed with the Japanese Patent office on Sep. 14, 1998 and Sep. 16, 1998, the entire contents of each being hereby incorporated by reference.

What is claimed is:

1. A method for producing a fine metal particle-dispersion solution comprising:

mixing a solution (A) comprising at least one metal salt, said metal comprising one or more metals selected from the group consisting of Au, Pt, Ir, Pd, Ag, Rh, Ru, Os, Re and Cu; and a solution (B) comprising at least a molar concentration of citrate ion relative to a total valence number of metal ion in solution (A) and ferrous ion under an atmosphere having substantially no oxygen to produce fine metal particles, wherein at least a molar concentration of said citrate ion is at least not less than a molar concentration of said ferrous ion, relative to a total valance number of metal ion in solution (A).

2. The method of claim 1, further comprising:

recovering said fine metal particles from a mixed solution after mixing solution (A) and solution (B);

desalting said fine metal particles; and re-dispersing said desalted fine metal particles in water, an organic solvent or a mixture thereof.

3. The method of claim 2, wherein said fine metal particle-dispersion solution after said desalting and re-dispersing steps is provided with a pH of from 3.2 to 8.0, an electric conductivity of up to 2.0 mS/cm and a metal content of from 0.1 to 10% by weight.

4. The method of claim 1, further comprising preparing said aqueous solution (B) under an atmosphere having substantially no oxygen.

5. The method of claim 1, wherein said mixing is carried out at a temperature of from 25 to 95° C. while stirring.

6. The method of claim 1 wherein said solution (B) comprises citrate ion and ferrous ion, each in an amount of one to five moles respectively relative to a total valence number of metal ion in solution (A) and has pH 3 to 10.

7. The method of claim 1 wherein said solution (A) and solution (B) are prepared such that a pH of said mixed solution is from 3 to 9 after the mixing step and a stoichiometric amount of metal formation is from 2 to 60 g/L.

8. The method of claim 1 wherein said mixing is carried out by adding solution (A) to solution (B).

9. The method of claim 1 wherein solution (A) comprises an Ag salt and a Pd salt in a Pd/(Pd+Ag) weight ratio of from 0.001 to less than 1.

10. The method of claim 1, wherein a ratio of said content of said citrate ion to said content of said ferrous ion is 3:2.

11. A fine metal particle-dispersion solution wherein fine metal particles are dispersed in water, an organic solvent or a mixture thereof, said metal comprising two or more metals selected from the group consisting of Au, Pt, Ir, Pd, Ag, Rh, Ru, Os, Re and Cu, said fine metal particles being precipitated by mixing a solution (A) comprising at least one metal salt, said metal comprising one or more metals selected from the group consisting of Au, Pt, Ir, Pd, Ag, Rh, Ru, Os, Re and Cu; and a solution (B) comprising at least a molar concentration of citrate ion relative to a total valence number of metal ion in solution (A) and ferrous ion under an atmosphere having substantially no oxygen to produce fine metal particles, wherein when said dispersion solution is centrifuged at two or more different gravitational acceleration values, a metal composition ratio of a filtrate is substantially the same as that of a precipitate at any gravitational acceleration such that a difference of said metal composition ratio between said filtrate and said precipitate is within a range of 6%, wherein at least a molar concentration of said citrate ion is at least not less than a molar concentration of said ferrous ion.

12. The fine metal particle-dispersion solution as claimed in claim 11, wherein said fine metal particles comprise Ag and Pd, in a Pd/(Pd+Ag) weight ratio of from 0.001 to less than 1 and a primary mean particle size of the fine metal particles is from 1 to 15 nm.

13. The fine metal particle-dispersion solution of claim 11, wherein a ratio of said content of said citrate ion to said content of said ferrous ion is 3:2.

14. A coating solution comprising i) Ag—Pd fine particles; and ii) water, an organic solvent, or a mixture thereof, said Ag—Pd fine particles being precipitated by mixing an aqueous solution (A) of a silver salt and a palladium salt and an aqueous solution (B) of at least a molar concentration of citrate ion relative to a total valence number of metal ion in solution (A) and ferrous ion under an atmosphere having substantially no oxygen, wherein at least a molar concentration of said citrate ion is at least not less than a molar concentration of said ferrous ion.

15. The coating solution of claim 14, wherein said Ag—Pd fine particles are desalted after the precipitation.

16. The coating solution of claim 14 wherein solution (B) is prepared under an atmosphere having substantially no oxygen.

17. The coating solution of claim 14, wherein said solution (B) comprises citrate ion and ferrous ion, each in an amount of one to five moles respectively relative to a total valence number of metal ion in solution (A) and has pH 3 to 10.

18. The coating solution of claim 14, wherein solution (A) and solution (B) are mixed at from 25 to 95° C. while stirring such that pH of the mixed solution is from 3 to 9 after the mixing and a stoichiometric amount of metal formation is from 2 to 60 g/L.

19. The coating solution of claim 14, wherein a Pd/(Pd+Ag) weight ratio in solution (A) is from 0.001 to less than 1 and a primary mean particle size of the Ag—Pd fine particles is from 1 to 15 nm.

20. The coating solution of claim 14, wherein said coating solution has a pH of from 3.2 to 8.0, an electric conductivity of up to 2.0 mS/cm and a metal content of from 0.1 to 10% by weight.

21. A method for forming a multi-layer conductive film having a low resistance comprising:

a) coating on a base, the coating solution of claim 20 and drying the coated solution; and b) coating a binder-containing solution on said Ag—Pd fine particles film and drying thereof.

22. The method of claim 21 wherein said binder-contained solution comprises a silica precursor.

23. The coating solution of claim 14, wherein said coating solution does not contain a binder.

24. The coating solution of claim 14, wherein said coating solution comprises a binder selected from the group consisting of an inorganic binder, an organic binder or a mixture thereof.

25. A multi-layer conductive film having a low reflectivity, a low resistance and an excellent durability which is formed on a base and comprises i) an underlayer comprises Ag—Pd fine particles formed by the coating solution of claim 14, and ii) an upperlayer comprises a transparent film having a refractive index lower than that of said underlayer.

26. The multi-layer conductive film of claim 25, wherein said transparent film comprises a film comprised of a material formed by a silica-precursor.

27. The multi-layer conductive film of claim 26, wherein said silica-precursor is selected from the group consisting of an alkoxysilane, and a hydrolysate of an alkoxysilane.

28. The multi-layer conductive film of claim 26, wherein said silica-precursor is a silica sol.

29. The multi-layer conductive film as claimed in claim 25, wherein said base is an image display part of an image display device.

30. The coating solution of claim 14, wherein a ratio of said content of said citrate ion to said content of said ferrous ion is 3:2.

31. A multi-layer conductive film having a low reflectivity and a low resistance which is formed on a base and has two layers comprising an underlayer including Ag—Pd fine particles and an upperlayer composed of a film comprised of a material formed by a silica-precursor, wherein an initial surface resistance is a degree of from $10^2$ to $10^3$ Ω/□ and a surface resistance is up to 2 times of the initial surface resistance after any one of a thermal resistance test at 250° C. for 24 hours, a humidity resistance test for 10 days at 60° C. under a relative humidity of 80% and a weather resistance test for 10 days with UV irradiation at a distance of 1 cm from a black light wherein said Ag—Pd fine particles being precipitated by mixing an aqueous solution (A) of a silver salt and a palladium salt and an aqueous solution (B) of at least a molar concentration of citrate ion relative to a total valence number of metal ion in solution (A) and ferrous ion under an atmosphere having substantially no oxygen, wherein at least a molar concentration of said citrate ion is at least not less than a molar concentration of said ferrous ion.

32. The multi-layer conductive film as claimed in claim 31, wherein said surface resistance is up to 2 times of the initial surface resistance and the film properties of the film do not change after any one of a chemical resistance test comprising dipping in an aqueous solution of 2% hydrogen peroxide at a room temperature for 5 hours and a chemical resistance test comprising dipping in a solution of 0.1 N hydrochloric acid at a room temperature for 5 hours.

33. The multi-layer conductive film of claim 31, wherein said silica-precursor is selected from the group consisting of an alkoxysilane, and a hydrolysate of an alkoxysilane.

34. The multi-layer conductive film of claim 31, wherein said silica-precursor is a silica sol.

35. The multi-layer conductive film of claim 31, wherein a ratio of said content of said citrate ion to said content of said ferrous ion is 3:2.

36. A coating solution comprising:

Ag—Pd fine particles dispersed in water, an organic solvent or a mixture thereof, said Ag—Pd fine particles being precipitated by mixing an aqueous solution (A) of a silver salt and a palladium salt and an aqueous solution (B) of at least a molar concentration of citrate ion relative to a total valence number of metal ion in solution (A) and ferrous ion under an atmosphere having substantially no oxygen, wherein when said dispersion solution is centrifuged at two or more different gravitational acceleration values, a metal composition ratio of a filtrate is substantially the same as that of a precipitate at any gravitational acceleration such that the difference of said metal composition ratio between said filtrate and precipitate is within a range of 6%, wherein at least a molar concentration of said citrate ion is at least not less than a molar concentration of said ferrous ion.

37. The coating solution of claim 36, wherein a ratio of said content of said citrate ion to said content of said ferrous ion is 3:2.

* * * * *